(12) United States Patent
Byrne

(10) Patent No.: US 11,066,028 B2
(45) Date of Patent: Jul. 20, 2021

(54) SIDE BARRIER AND HINGE

(71) Applicant: Ronan Anthony Byrne, Harrow Weald (GB)

(72) Inventor: Ronan Anthony Byrne, Harrow Weald (GB)

( * ) Notice: Subject to any disclaimer, the term of this patent is extended or adjusted under 35 U.S.C. 154(b) by 87 days.

(21) Appl. No.: 16/336,778

(22) PCT Filed: Sep. 21, 2017

(86) PCT No.: PCT/GB2017/052825
§ 371 (c)(1),
(2) Date: Mar. 26, 2019

(87) PCT Pub. No.: WO2018/060681
PCT Pub. Date: Apr. 5, 2018

(65) Prior Publication Data
US 2019/0225173 A1 Jul. 25, 2019

(30) Foreign Application Priority Data
Sep. 27, 2016 (GB) ..................................... 1616354

(51) Int. Cl.
*B60R 19/56* (2006.01)
*B60R 19/38* (2006.01)
(52) U.S. Cl.
CPC ............ *B60R 19/565* (2013.01); *B60R 19/38* (2013.01)
(58) Field of Classification Search
CPC ......... B60R 19/38; B60R 19/42; B60R 19/54; B60R 19/56; B60R 19/565
USPC ........................................ 296/118, 126, 128
See application file for complete search history.

(56) References Cited

U.S. PATENT DOCUMENTS

| 4,060,268 A | 11/1977 | Page, Jr. |
| 4,688,824 A | 8/1987 | Herring |
| 4,877,266 A | 10/1989 | Lamparter et al. |

(Continued)

FOREIGN PATENT DOCUMENTS

| DE | 4143294 A1 * | 6/1993 | ............. B60R 19/56 |
| DE | 9117004 U1 * | 1/1995 | ............. B60R 19/56 |
| DE | 10 2007 003916 | 7/2008 | |

(Continued)

OTHER PUBLICATIONS

English translation of DE 10 2007 003 916; retreived on Aug. 14 via PatentTranslate located at www.epo.org. (Year: 2020).*

*Primary Examiner* — Jason S Daniels
(74) *Attorney, Agent, or Firm* — Woods Oviatt Gilman LLP; Katherine H. McGuire Esq.

(57) ABSTRACT

A side barrier for a truck or trailer, the side barrier comprising at least one barrier member and at least two support arms between which the at least one barrier member hingedly extends, the at least two support arms being provided with hinges one for connection to the at least one barrier member and the other for connecting the side barrier to the vehicle in a position lying parallel to the longitudinal length of the vehicle, wherein all the said hinges are arranged with respectively parallel axes. Usually a second barrier member is present via which the other hinges connect the support arms to the truck or trailer. The side barrier is for lowering the window below pre-existing side barriers for preventing or reducing accidents involving vulnerable people such as pedestrians or cyclists and vehicles.

20 Claims, 22 Drawing Sheets

(56) References Cited

U.S. PATENT DOCUMENTS

| | | | | |
|---|---|---|---|---|
| 6,626,475 | B2 * | 9/2003 | Schroeder | B60R 9/02 |
| | | | | 293/126 |
| 7,407,204 | B2 * | 8/2008 | Eriksson | B60R 19/565 |
| | | | | 293/102 |

FOREIGN PATENT DOCUMENTS

| | | | | |
|---|---|---|---|---|
| EP | 1026047 A2 * | 8/2000 | | B60R 19/565 |
| EP | 1500559 A1 * | 1/2005 | | B60R 19/565 |
| EP | 1707445 | 5/2007 | | |
| EP | 3050759 | 8/2016 | | |
| JP | S5579729 | 6/1980 | | |
| JP | S55171655 | 12/1980 | | |
| JP | 59077945 A * | 5/1984 | | B60R 21/34 |
| JP | S59199346 | 11/1984 | | |

\* cited by examiner

SIDE BARRIER AND HINGE

The present invention relates to a side barrier, or a side guard system, for providing lateral protection between longitudinally spaced wheels of a truck or between longitudinally spaced wheels of a trailer of an articulated truck or "artic" The side barrier will be for fitting at lower, side regions of the vehicle or trailer, usually one or more on each side. The present invention also relates to a vehicle or trailer fitted with such a side barrier or side guard system and one or more hinge therefor.

The design of vehicles, such as for example, vans, trucks, artics and the trailers therefor, are commonly such that the loading surface is typically highly elevated above ground level—clear of the tops of the wheels, to enable the provision of a flat and typically rectangular loading surface. As a consequence, most trucks and artics (their trailers) have a wide space to the sides of the vehicle between two longitudinally spaced wheels—commonly a front and a rear wheel, although wheels can also be clustered for higher load bearing—there are axle load limits on most British roads—whereupon the wide space can be between the clusters.

The space between the wheels presents dangers to neighbouring vehicles, such as motorcyclists, as they can accidentally nose into this space, especially if the truck or artic cuts up the motorcyclist, commonly leading to injury of the motorcyclist. This danger has been recognised by truck designers and lateral protection systems, such as side guards, have been developed for closing that space in a manner to resist such entry.

Due to the terrain that a large number of trucks navigate, including potholed road surfaces or rough tracks and speed bumps, the lateral protection systems generally have a minimum "above the road" height for the base of these side guards of between 350 mm and 550 mm (most commonly 500 mm) so that the side guards will not impact on the terrain even when such bumps are encountered during suspension compressions, as such an impact could create its own problems, such as damage to, or spillage of, the transported goods, or simply some significant vehicular damage. That height is generally low enough to prevent travelling motorbikes from entering the space. However, it is not low enough to prevent vulnerable road users, such as a pedestrian, a cyclist or a slow moving motorcyclist from entering the space.

Given the increasing popularity of online shopping, and growing populations and the corresponding increase in the requirement for delivery of goods into city centres and other built up areas, there is an increased presence of lorries, and perhaps artics (with trailers), in built-up areas or city centres throughout most of the day. There is also a growing concern regarding the high number of accidents involving vulnerable road users, such as pedestrians, cyclists or motor cyclists and such situations where the injured person had fallen under the side bar.

Most areas of vehicle design to try to minimise this danger have concerned visibility as the driver has a blind spot on his inside when turning. As such the proposed solutions have generally been bigger or multiple side mirrors, some with additionally curved/lensed surfaces. The present inventor, however, has instead realised that improvements to the side protectors are required.

According to the present invention there is provided a side barrier for a vehicle, such as a truck or trailer, the side barrier comprising at least one barrier member and at least two support arms between which the at least one barrier member hingedly extends, the at least two support arms being provided with hinges, one for connection to the at least one barrier member and the other for connecting the side barrier to the vehicle in a position lying parallel to the longitudinal length of the vehicle, wherein all the said hinges are arranged with respectively parallel axes that are arranged to extend generally perpendicular to longitudinal length of the vehicle once the side barrier is connected thereto.

The present inventors have realised that for cities or town centres, the current conventional height of pre-installed side barriers of up to a maximum (according to Regulation) of 550 mm is too high, and further that in city centres such a high height is not even necessary as the road surfaces, kerbs and any speed bumps will not have a height anyway near such a height, and heavy suspension compression is unlikely to be needed. As such there is rarely ever a risk of an impact of the side bar on a road surface. Furthermore, transport links do not have anything high enough to cause such a concern either. The present inventors therefore developed the alternative lateral protection system that provides better cyclist and pedestrian protection in town, but one which can hingedly move at least in the direction of travel of the vehicle, it thus being able to move upward should an impact ever occur, thus avoiding aggressive shaking of the vehicle in that event. The present invention also does not compromise the ability of the vehicle to drive on roads with larger speed bumps or potholes, or dirt tracks, dirt roads and other unmetalled roads—by allowing the barrier member to flex to a higher position via the hinges in the few occasions it might be needed.

It is preferred that the side barrier is connected to the truck or trailer's factory fitted side barrier or brackets or other solid objects at similar heights thereof. It is thus preferably a retro-fit barrier. It could be connected directly to mounting positions thereon via the said other hinges, or the said other hinges may connect to the vehicle via a further rail, the further rail being directly connectable to the vehicles factory fitted side barrier (or other solid objects), e.g. via nuts and bolts, or T-sectioned members that fit to pre-existing slots in those existing side bars or objects (which slots may be present already).

The present invention may therefore be a side barrier with at least two barrier members and at least two support arms.

The side barrier of the present invention lowers current side barriers with a pivotable barrier member below it—one that can rock at least backwards, but preferably forwards and/or backwards, relative to the truck or trailer to which it is attached. This ability to swing prevents it from being torn off or damaged in the event of the side barrier of the moving truck hitting the ground or an obstruction.

The inventors developed this as they realised that many trucks never go on rough roads or roads with large enough potholes or speed bumps to hit its side barrier.

At least one of the hinges may have a swing limitation arrangement whereby the degree of swing of the barrier member is limited. This might not be symmetrical with the arm, so it might freely swing backwards, but only a small amount in the forwards direction, or vice versa. This might allow a longer swinging beam while still not swinging into the wheel closest to it—i.e. the one in front or the one behind.

Preferably, at least one of the hinges is provided with a detent or bias system, whereby the swing-freedom of the hinge is restricted until the barrier member is forced harder than a certain threshold. This may involve the lower barrier being lifted a predetermined amount, or it may involve a threshold rotation force, before rotation of the arms about the hinges. This allows the lateral protection system, or side bar, to be generally locked in a default, usually vertically armed, position, yet swingable out of that position in the event of an impact with the ground.

The detent is preferably a sprung-ball and detent feature. Preferably the ball is mounted with a biasing means such as a spring in a socket within a hinge part of the arm, such as in a ring member—the socket typically extending either radially relative to the hinge axis, or parallel thereto, and the detent is provided in a surface of a collar or bearing surface of a hinge mount such that the detent faces the socket when the hinge is in the desired default position. The locations of the ball and biasing means, and the detent, can be reversed so that the detent is instead on the hinge part of the arm.

Instead of a threshold-catch, such as a ball (or roller) and detent, the barrier can be spring biased towards a default position at all times, such as by springs. Many varieties of springs can be used for this purpose.

Bias members and the threshold catches may also be combined.

Preferably the swinging of the swinging barrier member is substantially within the side plane of the vehicle—typically a vertical one. As such the arrangement prevents substantial inward swinging of the lateral protection system, whereby it can resist against inadvertent intrusion of the swinging barrier member into the space between the wheels, thus likewise preventing intrusion of a vulnerable road user, such as a pedestrian, cyclist or motorbike into that space.

There may be more than one barrier member, for example one mounted at the bottom, another at the top (for attachment of the top hinge of the arms to the vehicle) or even one or more middle barrier member—for example between two outer barrier members—at the top and bottom of the arms). Typically they will all be connected (pivotably) to the support arms.

A bottom edge of a lowermost barrier member is preferably arranged on its support arms, relative to the hinges that connect the support arms to the vehicle, so that when fitted to a vehicle the lowest edge of that barrier member sits between 100 mm and 350 mm from the ground, and more preferably about 250 mm from the ground. This is significantly closer to the ground than the maximum allowed amount, 550 mm, and thus significantly reduces the opportunity for intrusion into the side space of the vehicle.

The arm preferably has a length not exceeding 350 mm, preferably 300 mm for a 550 height pre-existing lower barrier member.

Preferably the barrier member is made of metal, such as aluminium or steel, although other stiff and strong materials can also be used.

Preferably it is designed to match the external shape of the side barrier member it is attached to via the arms. As such it may have a upside down T-shaped slot running along its length.

Preferably the lower barrier member has end-plugs having a tapering or curved underside. This helps it to swing, rather than break, when it impacts an object, and it covers any sharp edges of the ends of the lower support member.

Preferably the support arms are made of metal, such as aluminium or steel, although other stiff and strong materials can also be used.

Preferably if steel, the steel is galvanised or stainless steel. It preferably is instead aluminium. The weight of aluminium adequately assists the lower barrier member to return to its lowest "default" position by virtue of gravity (in addition to any provided spring bias, where provided).

Preferably the metal is painted or otherwise coated so as to be resistant to corrosion from typical salt spray as found on roads.

If aluminium, it is preferably anodised.

Preferably there are two support arms, and their ends are attached respectively to two barrier members.

If the length between the support arms exceeds 1.5 m, preferably there are three or more support arms.

Preferably from the outer support arms to the ends of the barrier members there is a distance of around 450 mm.

Preferably the lateral protection system is for retrofitting onto an existing lateral protection system of a vehicle. As such, the hinges of the support arms for attachment to the vehicle may be for attachment to the lateral protection system of the vehicle, such as pre-existing side rails or support arms therefore. The present invention might thus provide a retrofit solution for existing vehicles, in addition to its ability to be fitted to new vehicles, or even in factories.

The present invention can also provide one or more pairs of side barriers each side barrier mounted onto one of a respective pair of pre-fitted lateral protection systems of the vehicle or trailer. Thus one or more barrier will be for fitting down one side of the vehicle and the other side barrier(s) is for fitting on the other side of the vehicle, both thus providing separate lower level lateral impact protectors for the vehicle.

The swing of the barrier member relative to the vehicle is generally substantially within a vertical plane. In this manner, it might swing to raise a lower hinge pair up towards, but spaced to the longitudinal side of (either forwardly or backwardly) an upper hinge pair The same would happen with three or more support arms and the corresponding six hinges. By virtue of that verticality, however, the lower barrier member will reach a maximum height—below the upper hinges as the bar of the lower barrier member would hit that hinge (or more likely the bar to which it is attached—preferably an upper barrier member of the side barrier). More preferably, therefore, at two hinges, usually a pair of hinges on a common barrier member, or on different support arms, will additionally include a camming arrangement to swing the barrier member slightly laterally—the depth of the cam—as well as vertically, thus causing the plane of the swing being slightly angled from vertical.

It is preferred that the side barrier is fitted to the inside of the pre-existing side barrier, and thus the tilt of this non-vertical plane would generally be tapering upward and inwardly. However, the side barrier can instead be fitted to the outside, whereupon, if the cam is provided, the plane will generally tilt upward and outwardly.

Instead of the cam, the hinges may all have a vertical angle for their axes relative to the lateral plane of the vehicle to the same effect (inward (or outward) deflection of the barrier member(s) below the top of the arms). The axes, although non-aligned vertically and lying horizontally, would instead be angled off the horizontal, and the would instead define two parallel planes.

Through an inward or outward deflection of the lower barrier members, they will be able to adopt a higher raised position as the raising lower barrier member would be displaced from the vertical plane of the pre-existing side barrier.

In yet a further arrangement of the present invention, the support arms can comprise adjustment means for allowing a selective adjustment of the default height for the barrier member thereon. Preferably the adjustment mechanism comprises a screw thread or lockable telescopic (piston-like or square) arrangement whereby the length of the support arms becomes adjustable. Other approaches for this include apertured bars that connect to each other, side by side, via bolts through appropriate aligning apertures thereof, or a similar design, but instead using box section or round tubes. These modifications can thus allow the lateral protection system of the present invention to be fitted to vehicles with different pre-existing lateral protection system arrangements, such as ones having a ride clearance height of at or close to the maximum allowed distance of 550 mm or on alternative lateral protection systems provided on other vehicles which may have a lower pre-existing position.

The support bar may also want some form of flexibility, albeit only a limited amount under typical load conditions. For this purpose, one or more of the arms may be a two-piece length, perhaps with a hinge, but having a spring member for holding it together back in its default shape—usually straight. The spring member may be a rubber element or a coil spring, as examples. Usually the spring member would be on either side, although for a hinged design this may be impractical, thus usually only having a spring member or one side.

The spring member can be attached to flanges, or it might be a sprung washer—typically a rubber washer—threaded onto a through bolt that connects flanges off the joining ends of the two pieces of the arm.

Another bias that can resist swinging of the barrier would be magnets. By arranging magnets pole to opposed pole on an end of an arm and to a collar or mount thereof attached to the barrier member, the magnetic attraction of the two magnets can provide a threshold retention force, thus resisting initial swinging of the arms. The bias back to the default position is then controlled through gravity and that magnetic force.

A further approach for resisting the swinging action can be sheer pins, although upon each failure of those pins they would need to be replaced. They could be bridged between the end of the arm and a collar or mount, much like the magnets.

Preferred approaches for springs for resisting the swinging can include any one or more of (usually matched pairs of) a) leaf springs, b) coil springs, c) sprung struts and dampers, d) wound and tensioned clock springs, e) the sprung bias on a cam or just the cam and the weight of the swinging barrier member together, f) a sprung door closer type of arrangement, with a spring in a box connected to a hinged arm, or g) dual direction coil springs arranged in a ring form, or otherwise, that can push or pull in response to relevant swinging motion of the swinging barrier member.

These and other features of the present invention will now be described in greater detail with reference to the accompanying drawings in which.

Figure 1:
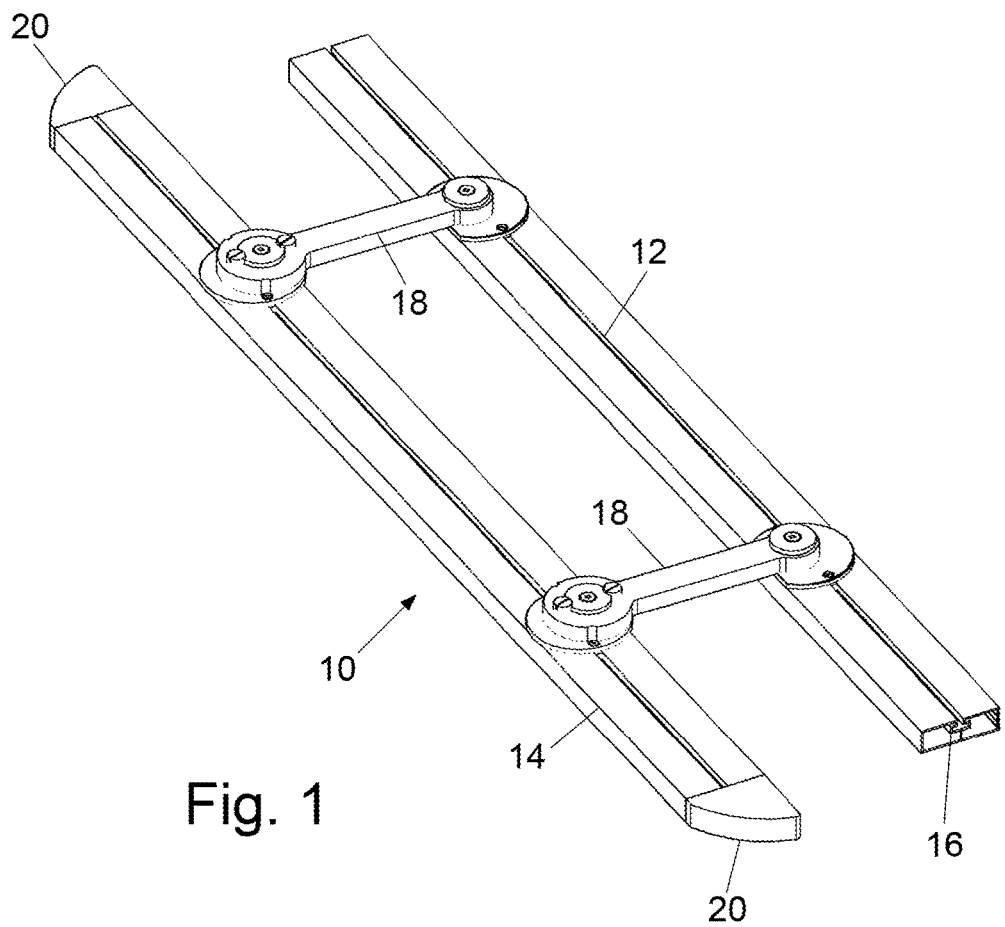
FIG. 1 shows a first embodiment of the present invention utilising a sprung ball and detent feature for providing a threshold resistance for the swinging of the lower barrier member, once fitted on a vehicle.
Figure 3:
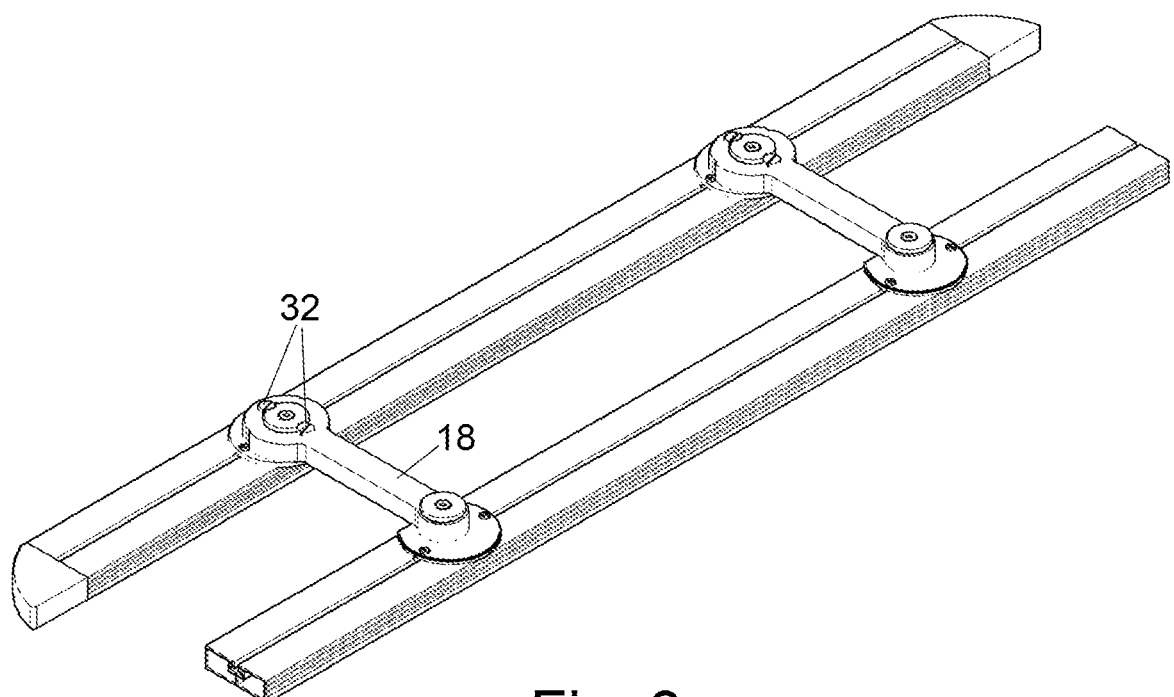
FIG. 3 shows a third embodiment with a heavier-duty pair of arms. In this embodiment the tubular casings for the sprung balls are flush with the top of the arm.
Figure 10:
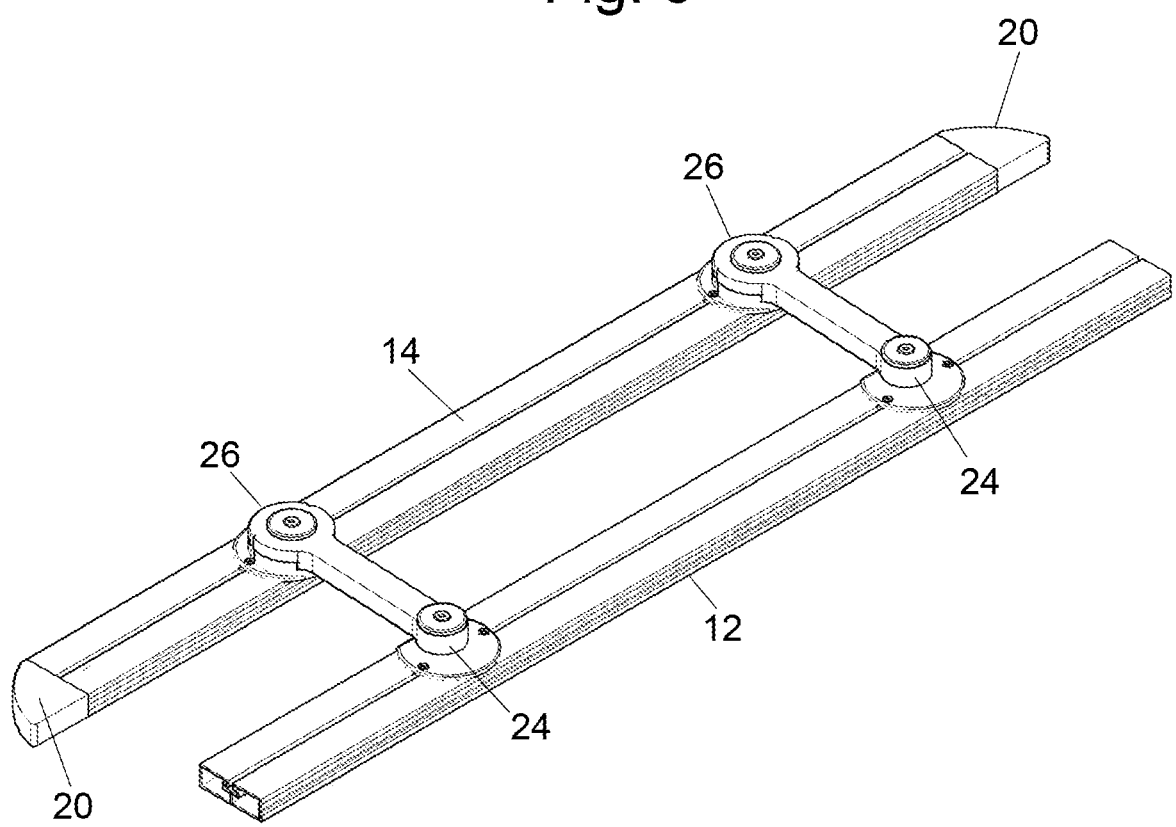
Figure 11:
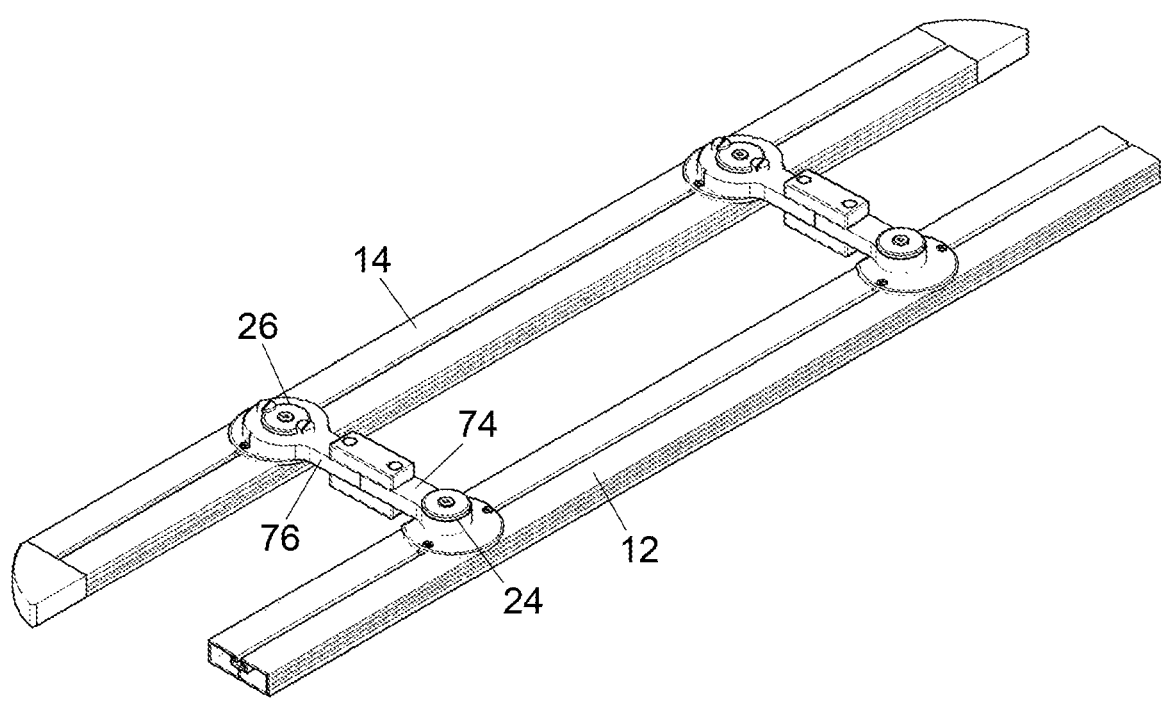
Figure 12:
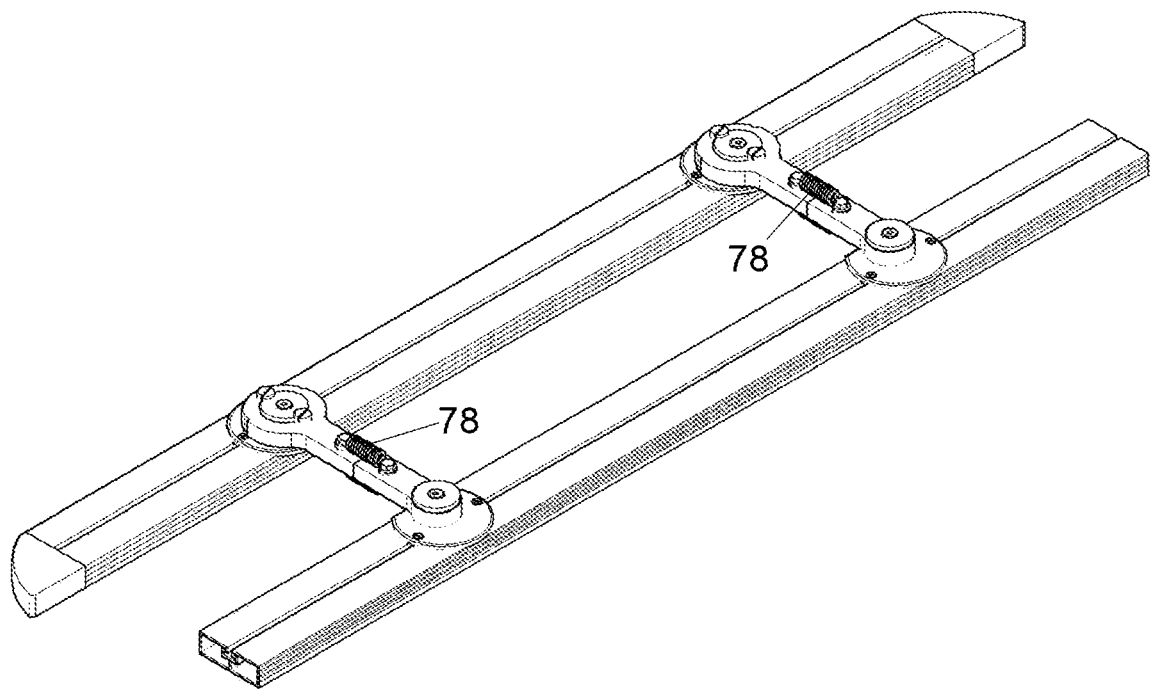
Figure 13:
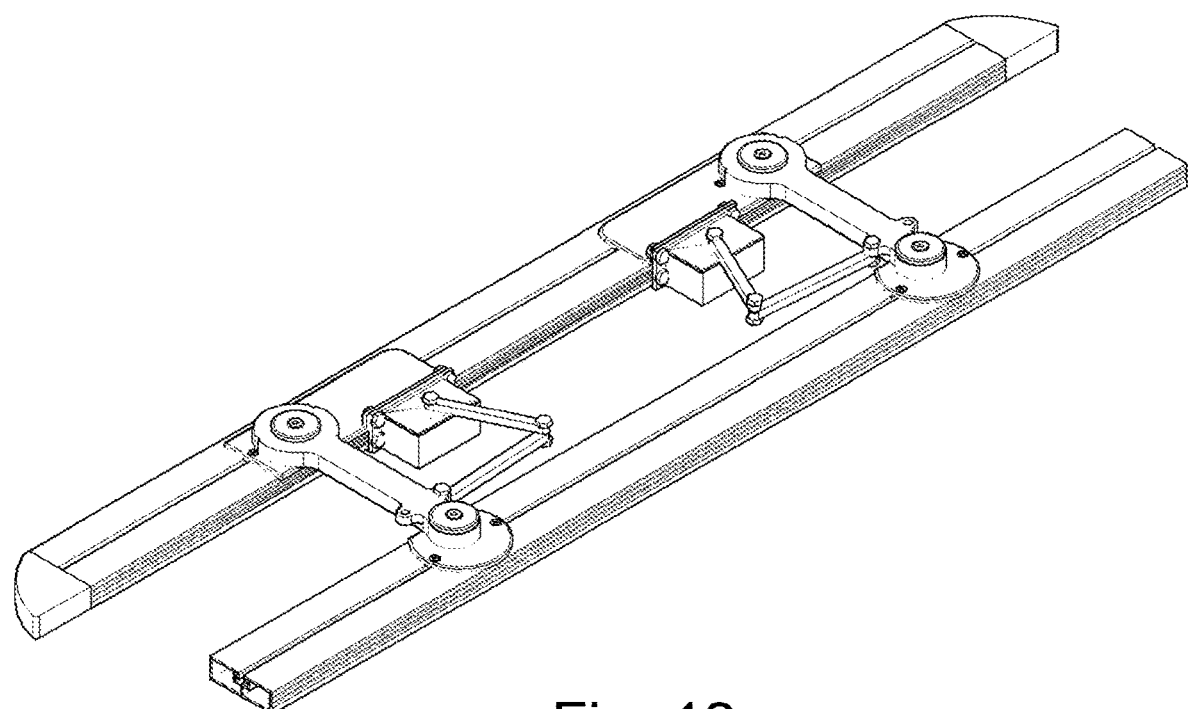
Figure 14:
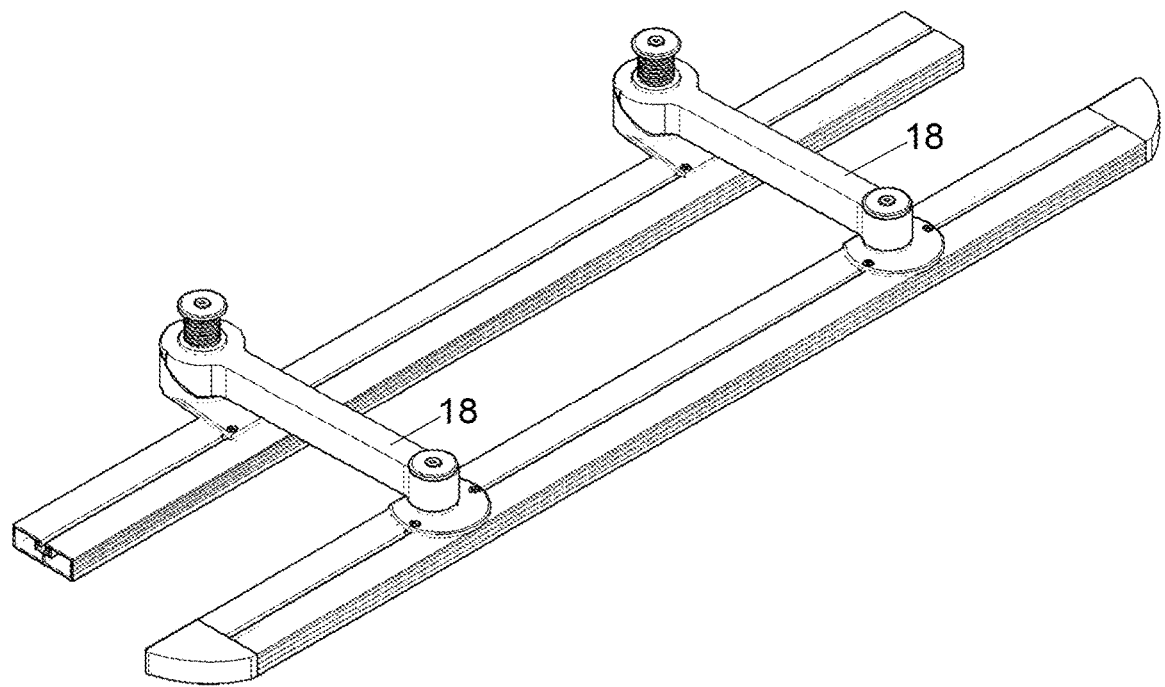
Figure 15:
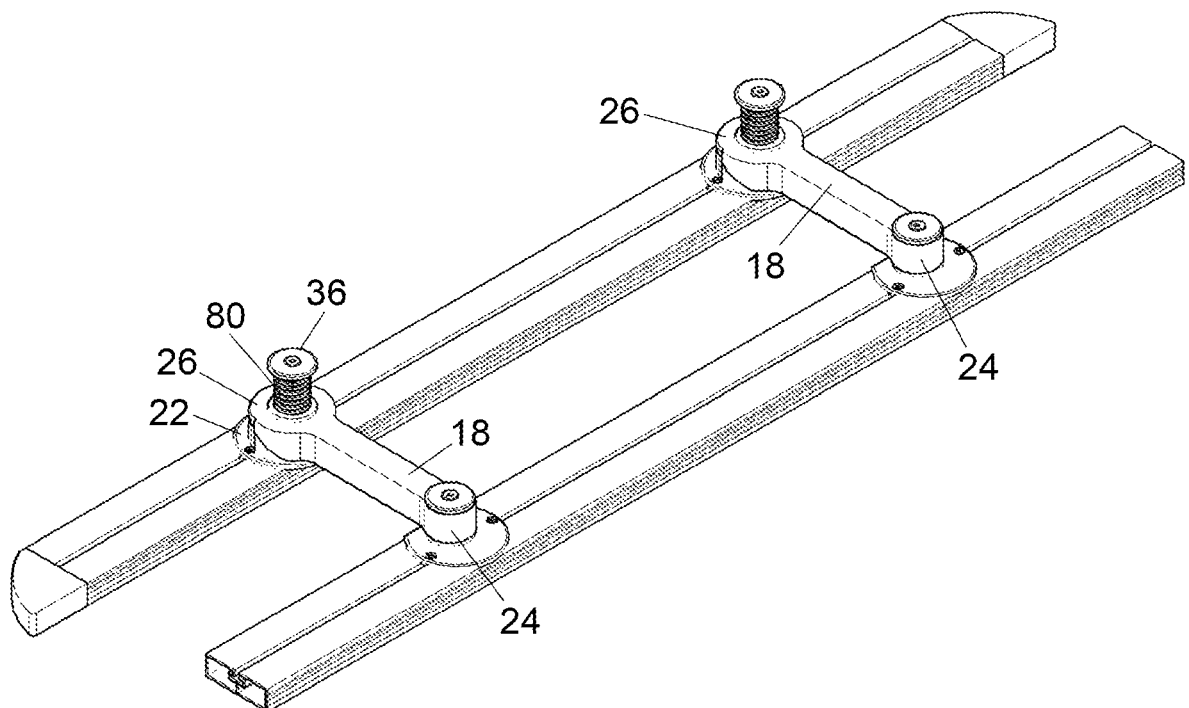
Figure 16:
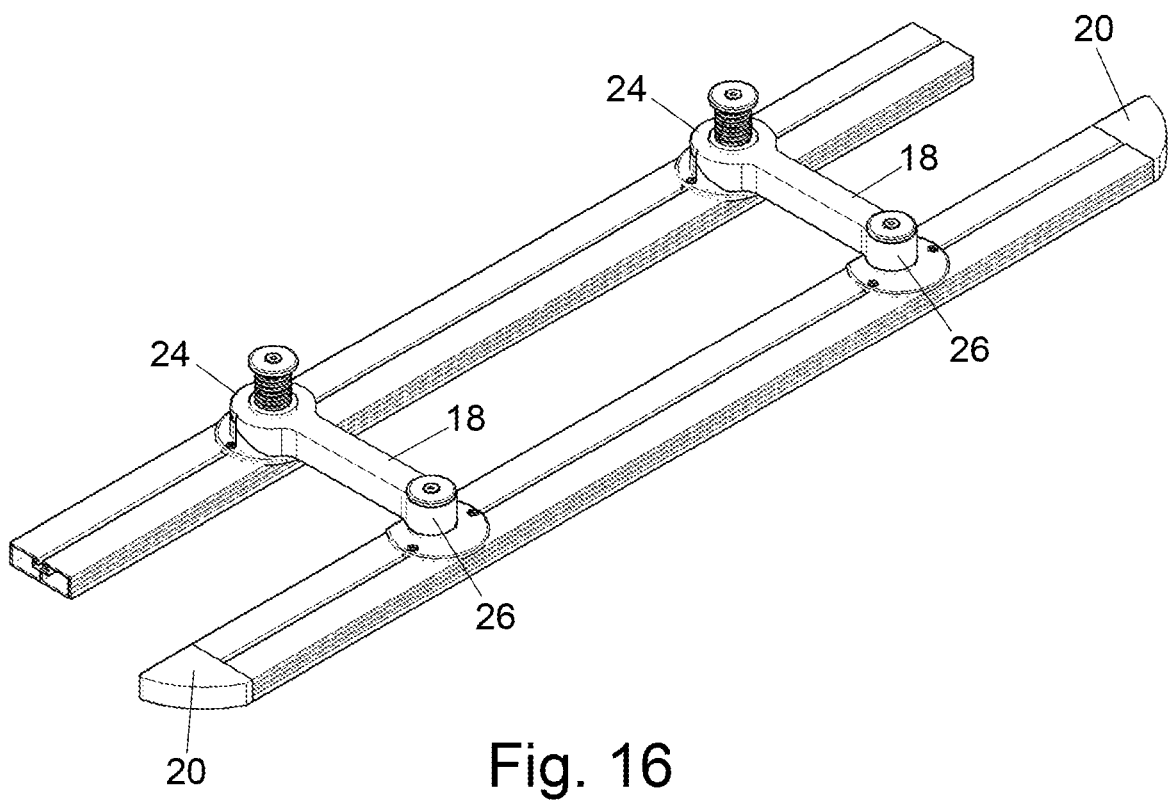
Figure 17:
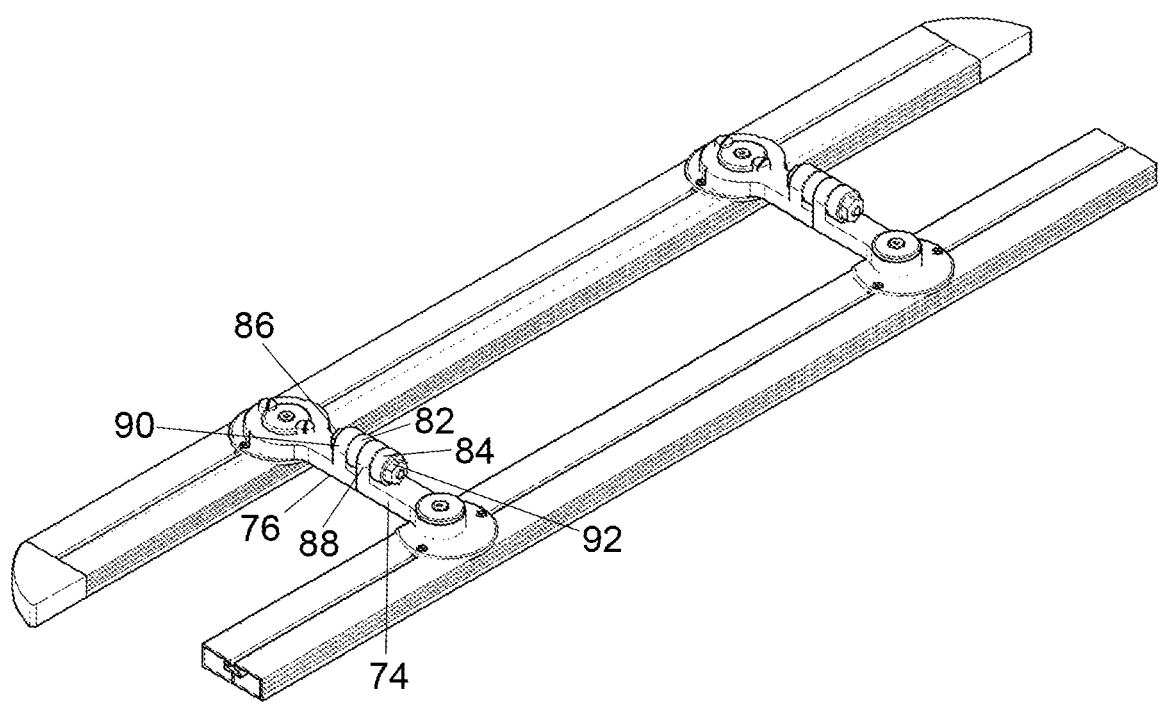
Figure 18:
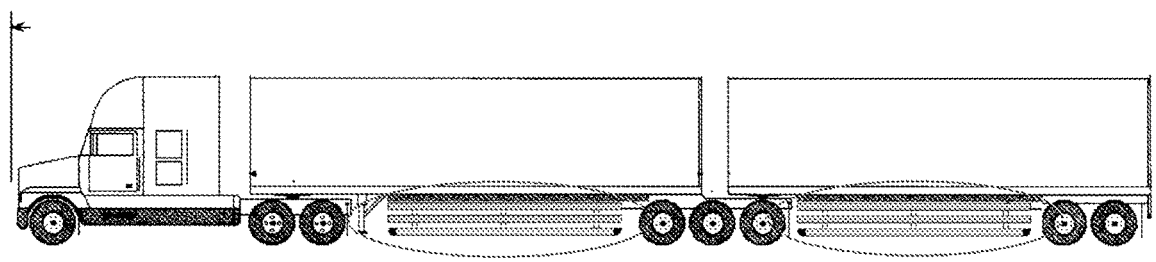
Figure 19:
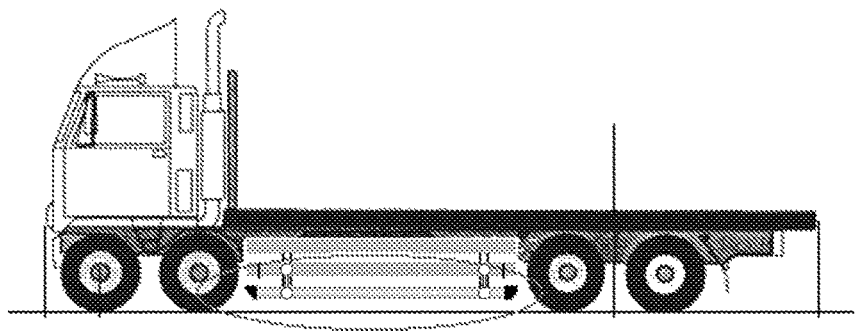
Figure 20:
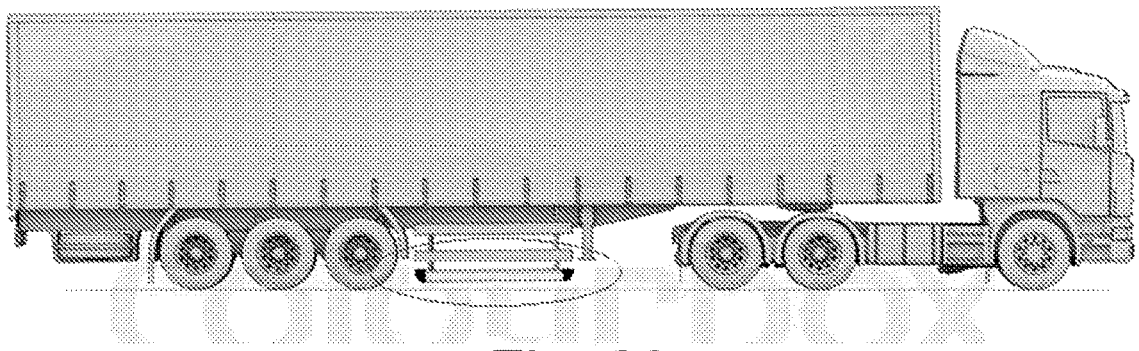
Figure 21:
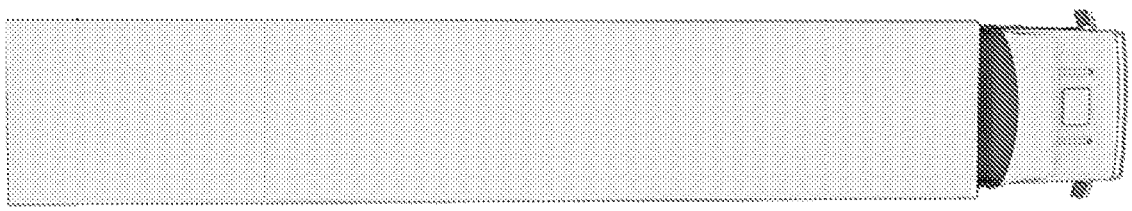
Figure 22:
Figure 24:
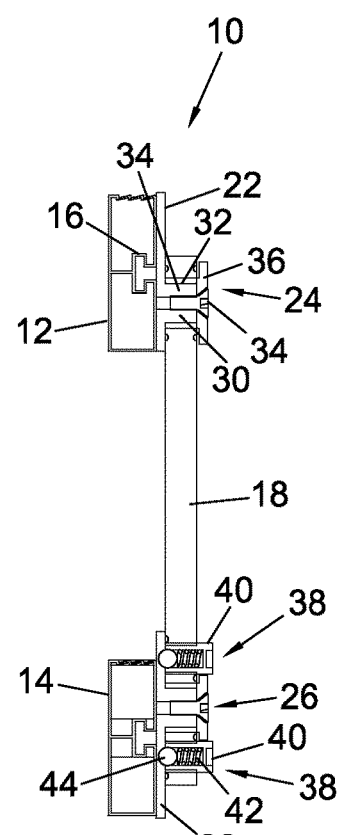
Figure 23:
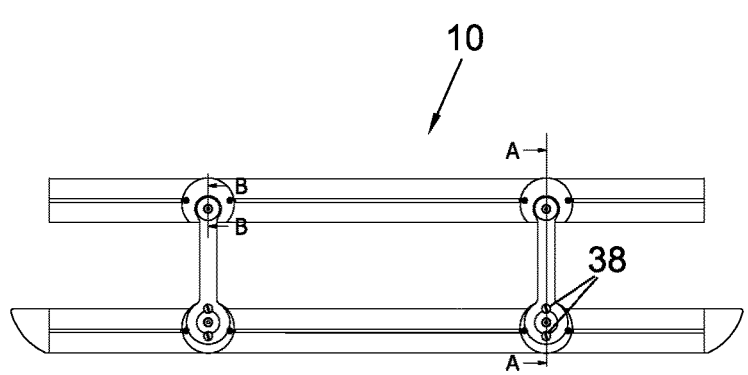
Figure 25:
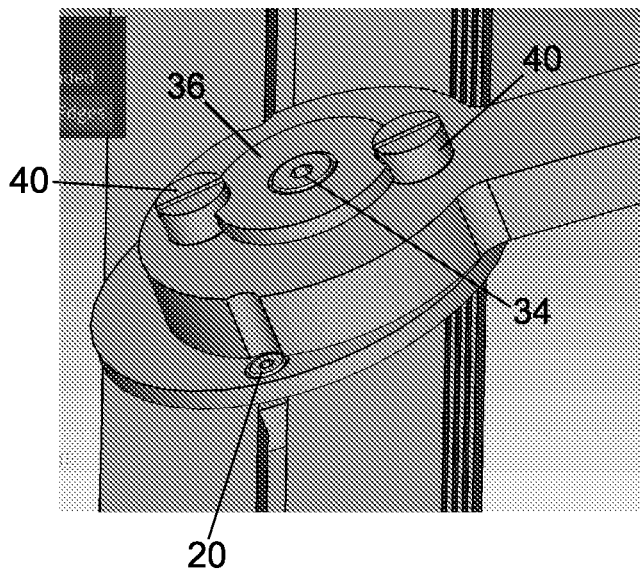

FIG. 10 uses two off-set magnets inside the bottom hinges for controlling swinging;

FIG. 11 shows a modification for the arm that might be added to numerous different embodiments, including that of FIGS. 1, 3, 4, 5, 6, 9, 10, 14, 15 and 16, with the shown embodiment being that of FIG. 1. Its arm is split into two lengths, and the two ends of the lengths are butted together and re-joined by rubber plates on either side of the arm;

FIG. 12 is a similar arrangement to FIG. 11, but instead of the rubber plates it is instead provided with springs on either side of the assembled arm;

FIG. 13 is an alternative embodiment in which the arm or bottom barrier member can be controlled and spring biased by a spring and arm arrangement, with the spring in this embodiment being mounted within a box, and the arm having two hinged lengths, the ends of which are attached to the spring and the arm;

FIG. 14 is an alternative embodiment in which one end of each arm incorporates a camming device, here with an angled cam on an extended part of the base plate, and a corresponding one on the arm, and a spring member for allowing the lower barrier member, when it swings, to swing both upwardly and outwardly, or inwardly (by virtue of the camming action, whereupon the swinging barrier member displaces laterally relative to the upper or stationary barrier member, and to swing up and over the upper or stationary barrier member;

FIG. 15 is similar to that of FIG. 14, but rather than the camming member being on an extended part of the baseplate, the baseplate is a circular one and thus the lower barrier member will lift less high relative to the pre-existing side barrier to which the present invention's side barrier is attached;

FIG. 16 shows a further embodiment, similar to that of FIG. 15, but in which the camming means is on the top barrier member;

FIG. 17 then shows another embodiment in which the arms are again split but in which the split components of each arm are tightened together using a flange on each arm, and a through bolt with rubber or elastomeric washers between the flanges, and to one side of one of the flange so as to allow a degree of flexure like that in FIGS. 11 and 12;

FIGS. 18, 19, 20 and 21 show possible fitment arrangements for side barriers in accordance with the present invention on various forms of lorry and artic, with:

FIG. 18 showing a dual trailer artic or road train having fitted thereto two side rails of the present invention (or 4 as the other side will match). The side barrier has three arms and is joined to a conventional side barrier with two barrier members and three uprights for connecting those two barrier members; the bottom barrier member is the one visible in the figure, with its end features attached thereto, and with its hinges on the reverse side of the visible pre-existing barrier member; and FIG. 19 instead showing a side barrier of the present invention attached to the outside of pre-existing side bars. In this case it is a truck rather than an artic; and FIGS. 20 and 21 showing the side barrier of the present invention attached to the inside of pre-existing side barriers of a trailer of a single trailer artic, in this case it being shorter, and thus only having 2 arms;

FIGS. 22 to 25 are further views of the embodiment of FIG. 1, with FIG. 22 being a top view, 23 being a front elevation and 24 being a schematic section showing the sprung balls in detents being engaged with one another while it is in the arrangement of FIG. 23, FIG. 23 being a front elevation of the product, FIG. 24 being a schematic cross-section and FIG. 25 being a closer view of the end of the arm carrying the sprung ball and detent (it can be seen in this embodiment they extend upwards from the external face of the arms, but other arrangements can be provided too—see, for example, FIG. 3, and the description relating thereto.

Figure 2:
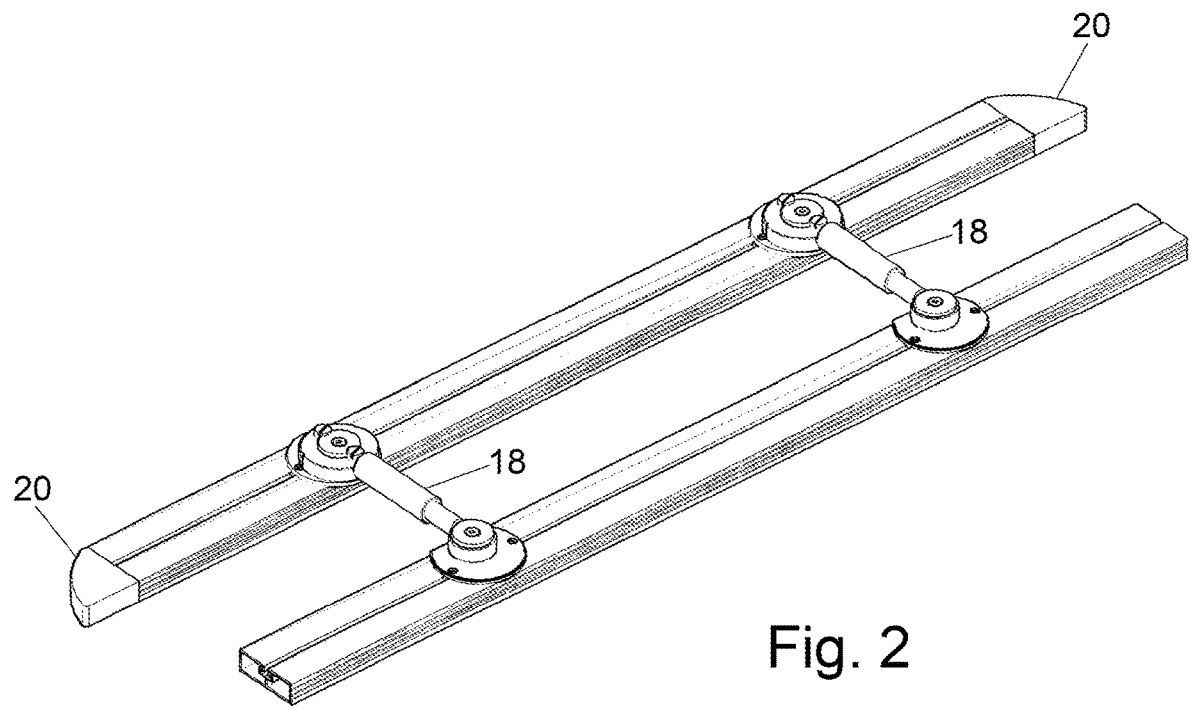
FIG. 2 shows a second embodiment of the present invention using a round pair of arms having a screw threaded rod within a receiving rod, the screw thread providing for length adjustment for each arm.
Figure 4:
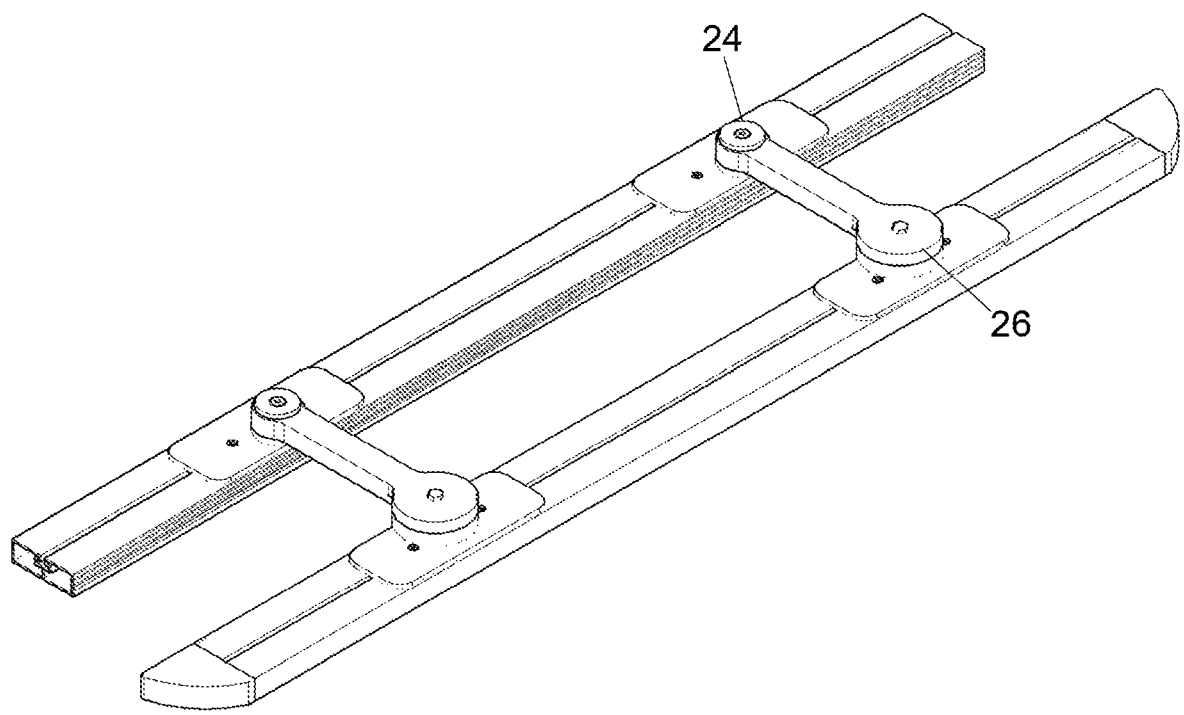
FIG. 4 shows an embodiment using dual springs inside the hinges to resist swinging.
Figure 5:
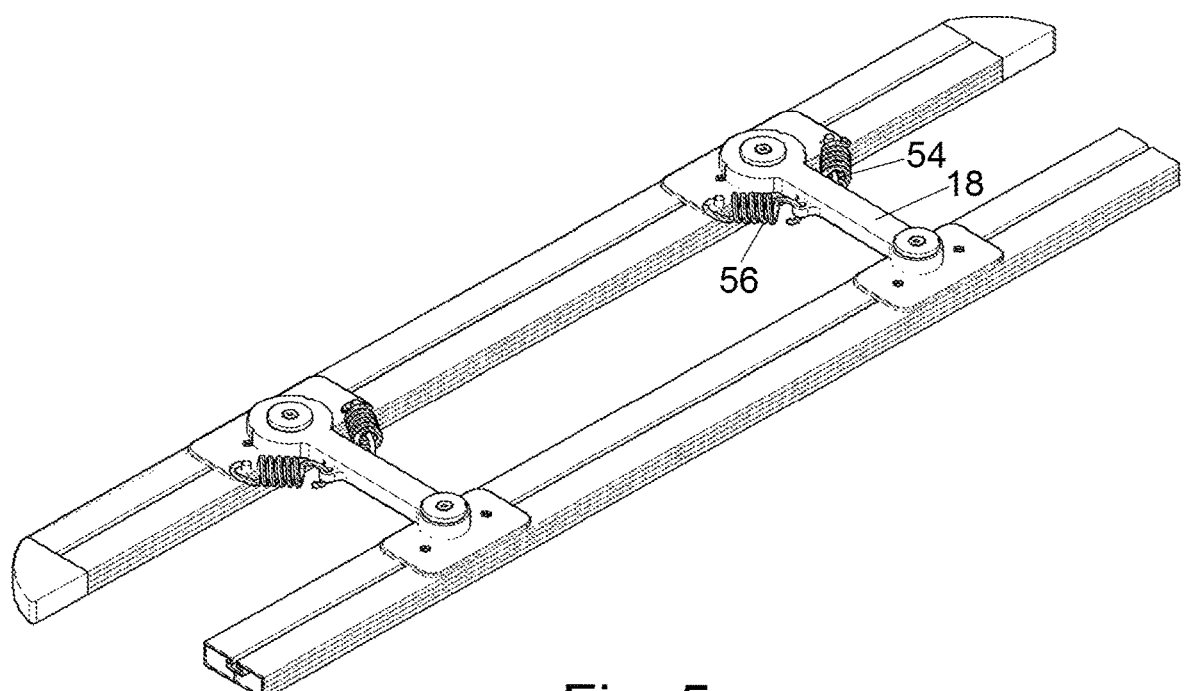
FIG. 5 shows an embodiment having a pair of external centering springs for each arm.
Figure 6:
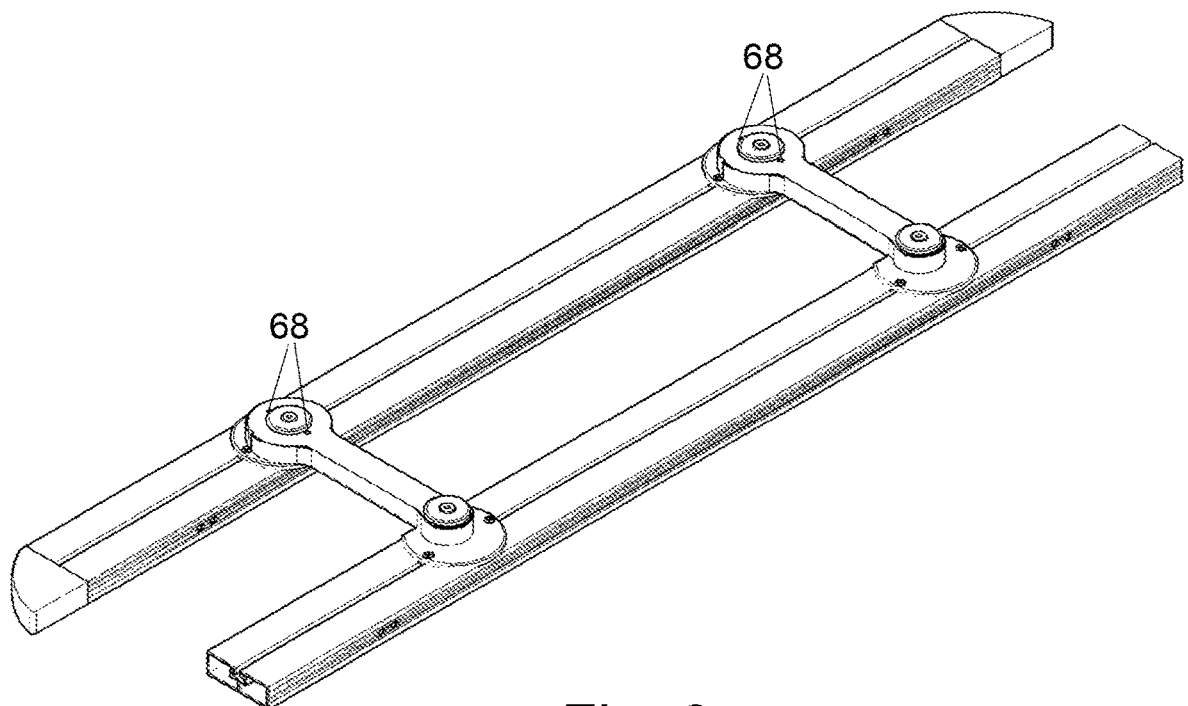
FIG. 6 is a further embodiment utilising shear pins as the means for preventing swinging.
Figure 9:
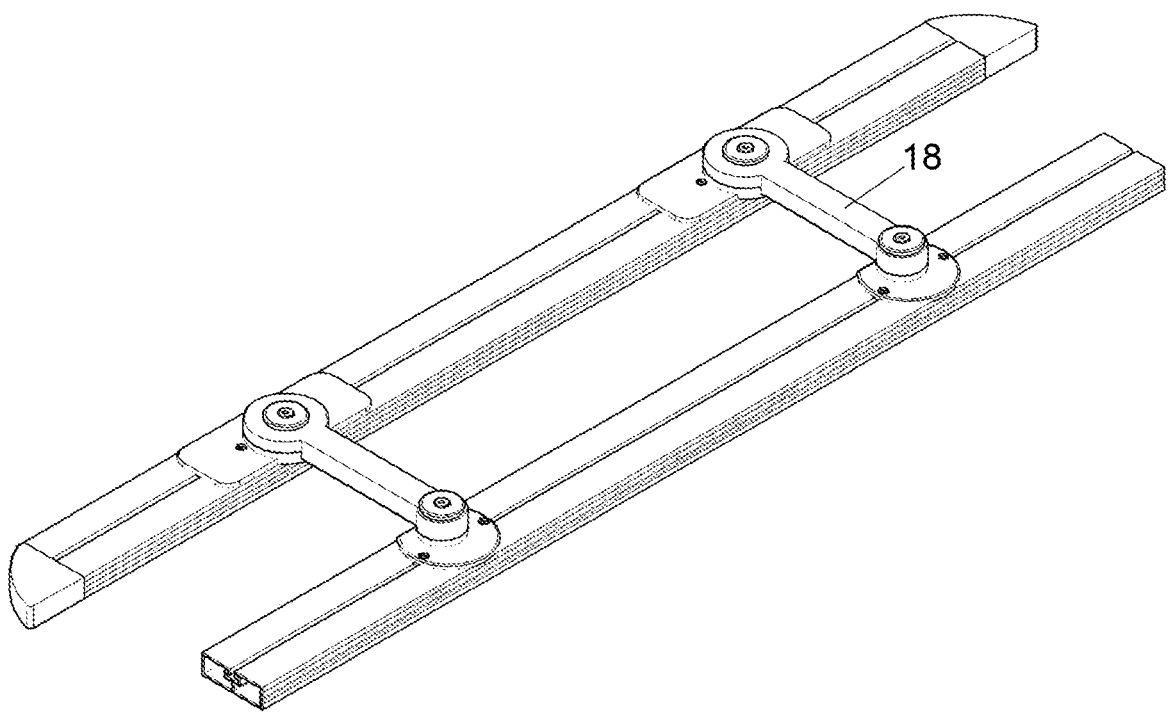
FIG. 9 is a further embodiment utilising a wound clock spring inside each bottom hinge for controlling the swinging.
Figure 26:
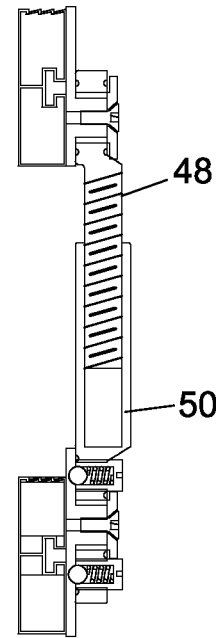
Figure 27:
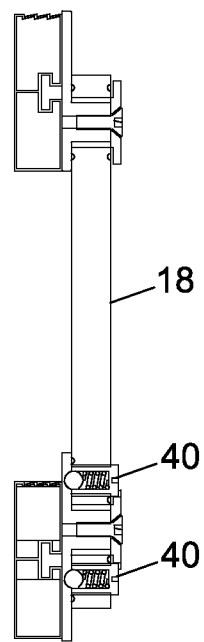
Figure 28:
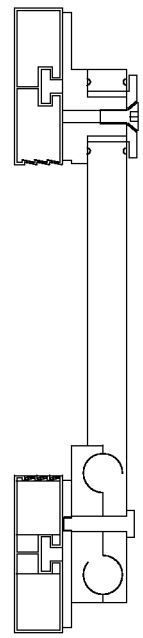
Figure 29:
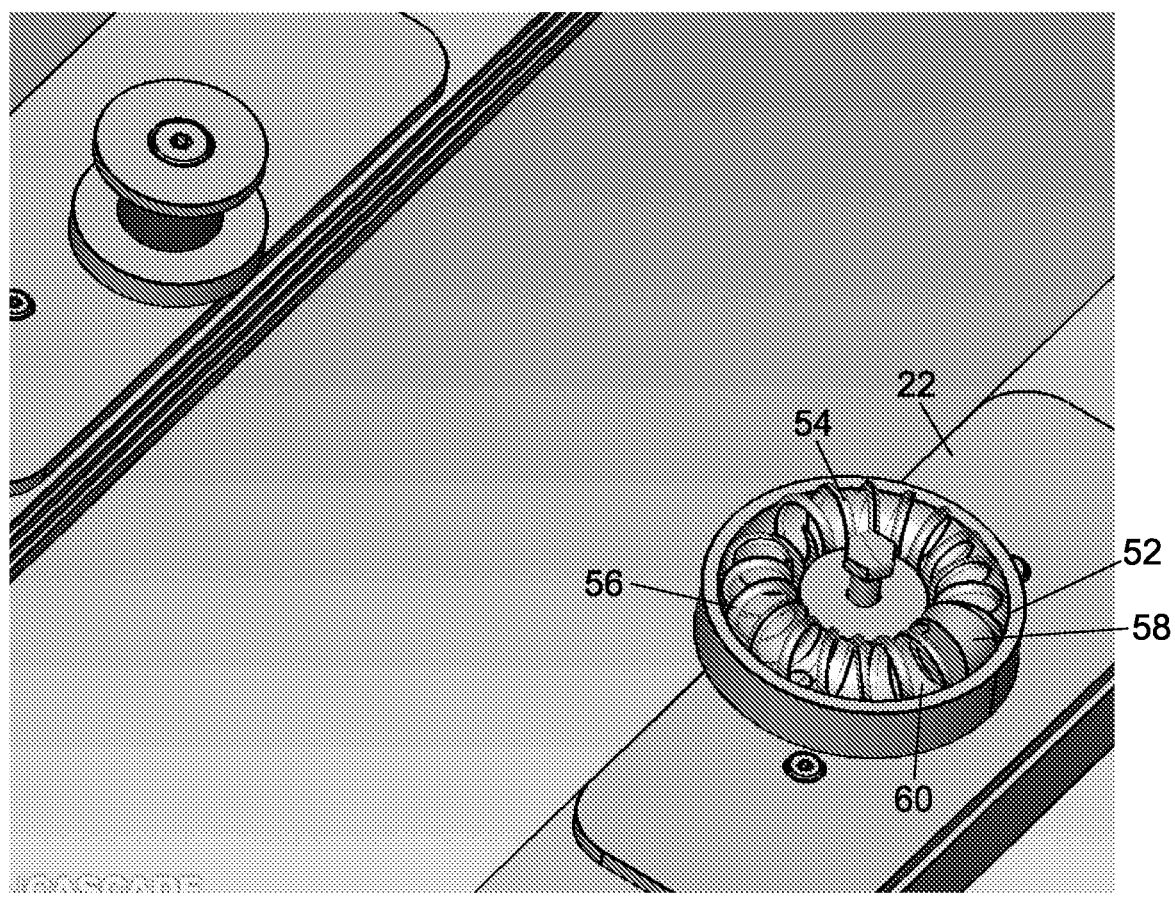
Figure 30:
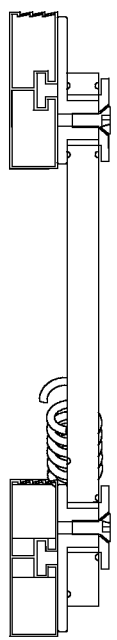
Figure 31:
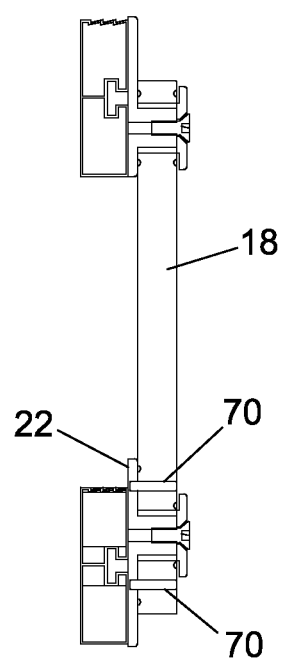
Figure 32:
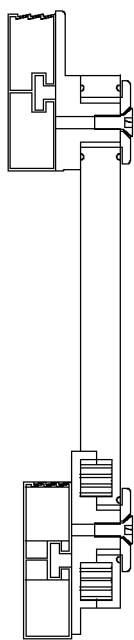
Figure 33:
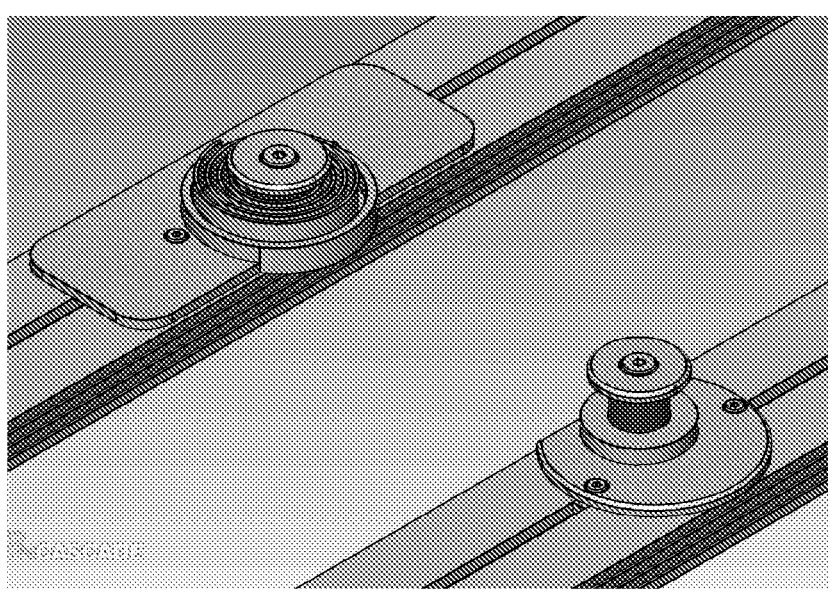
Figure 34:
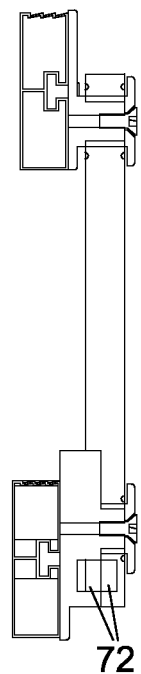
Figure 35:
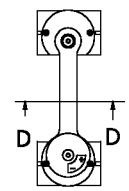
Figure 36:
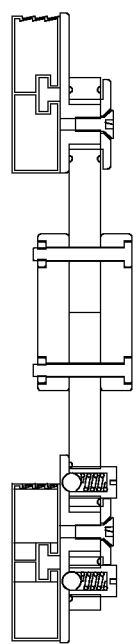
Figure 37:
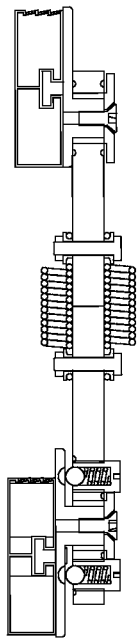
Figure 38:
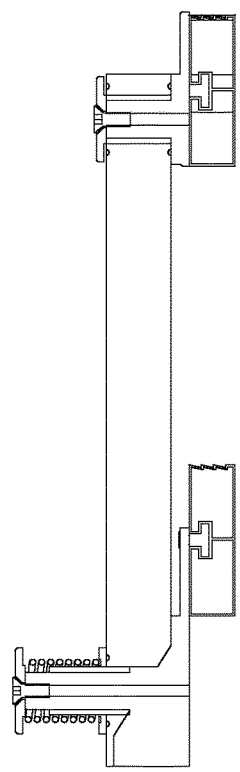
Figure 39:
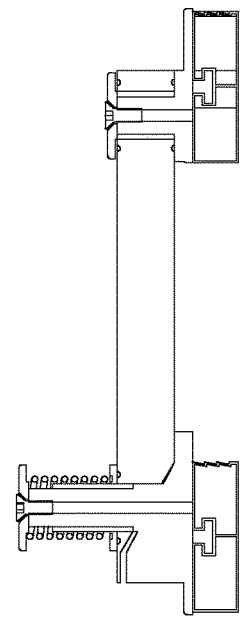
Figure 40:
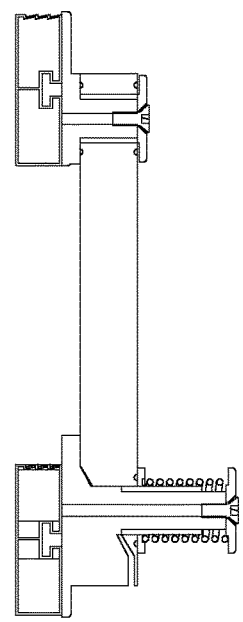
Figure 41:
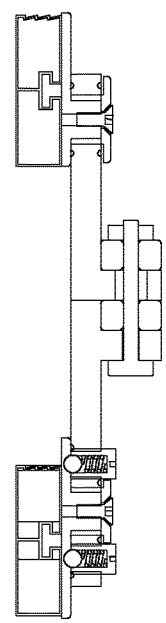
Figure 42:
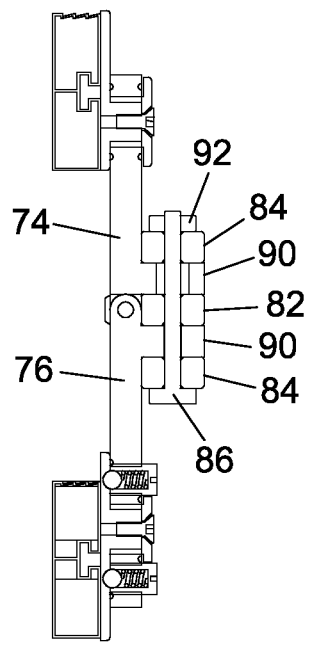
Figure 43:
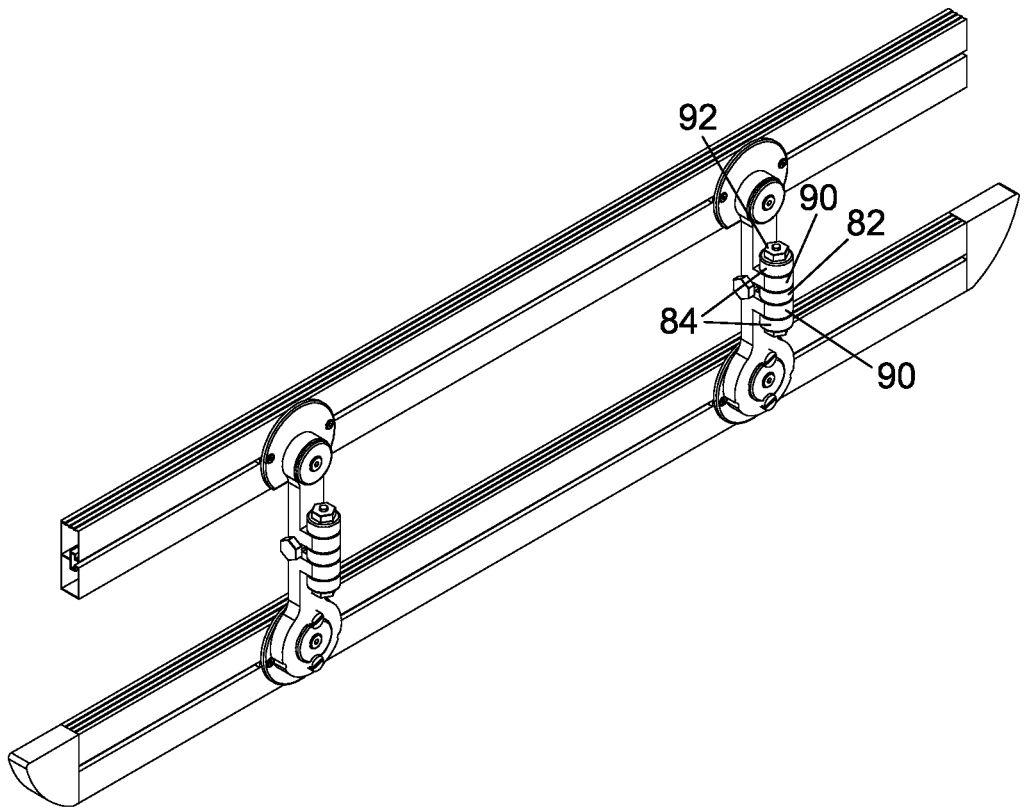
Figure 45:
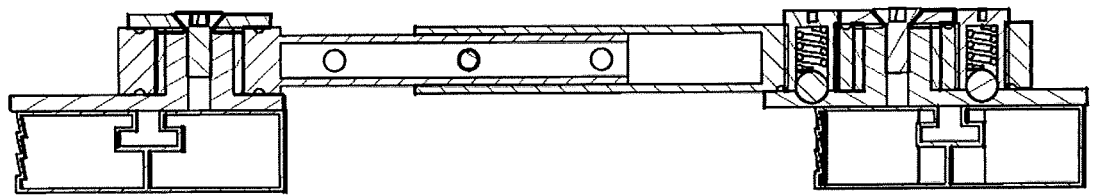
Figure 44:
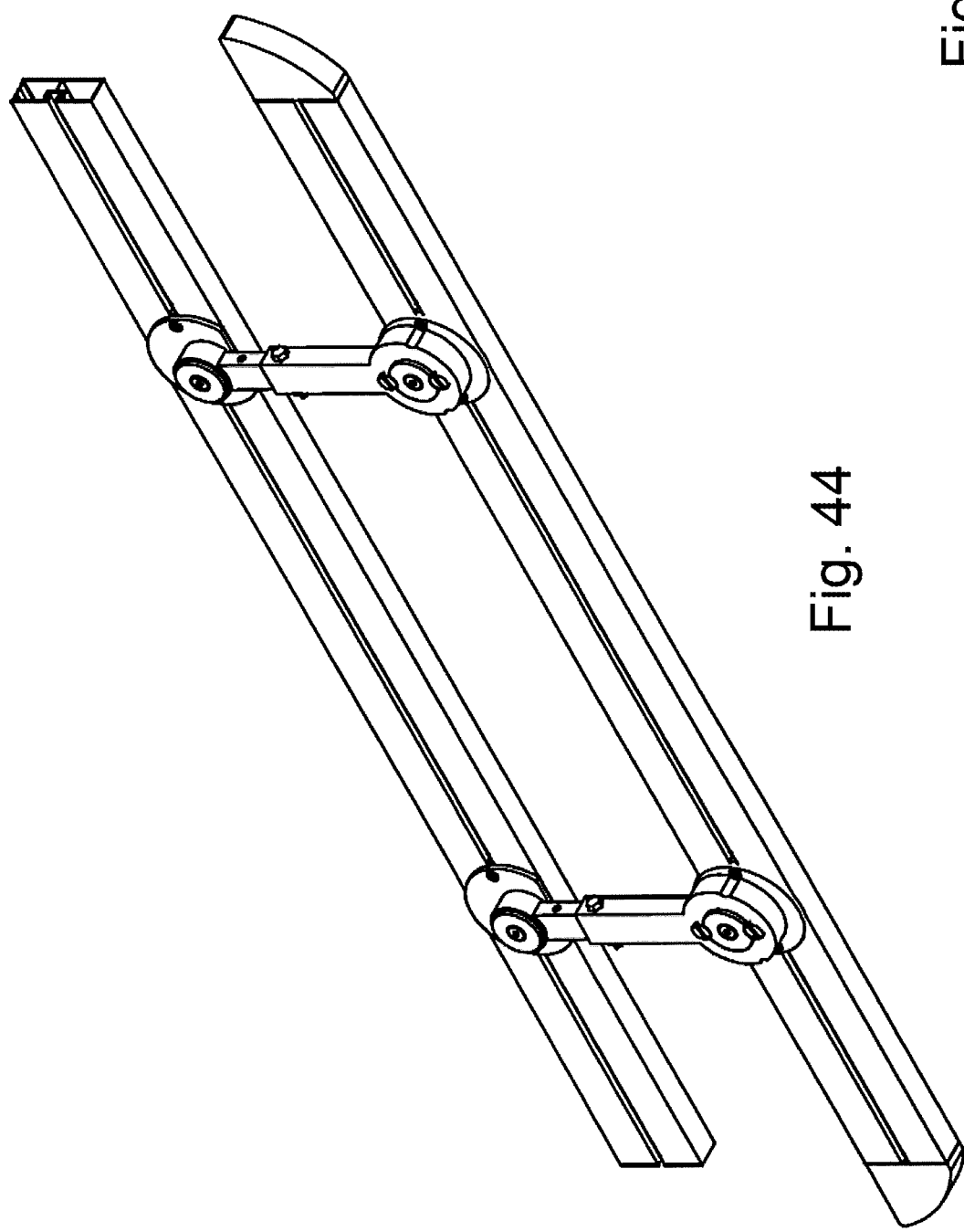
Figure 47:
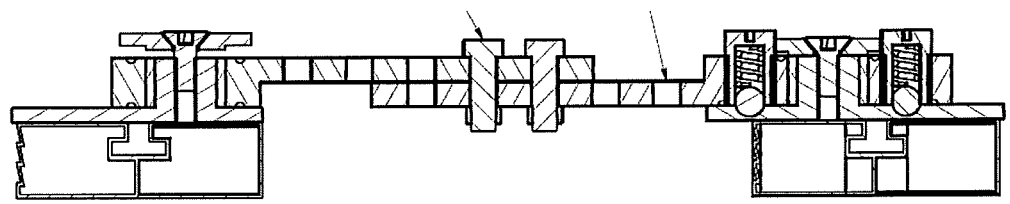
Figure 46:
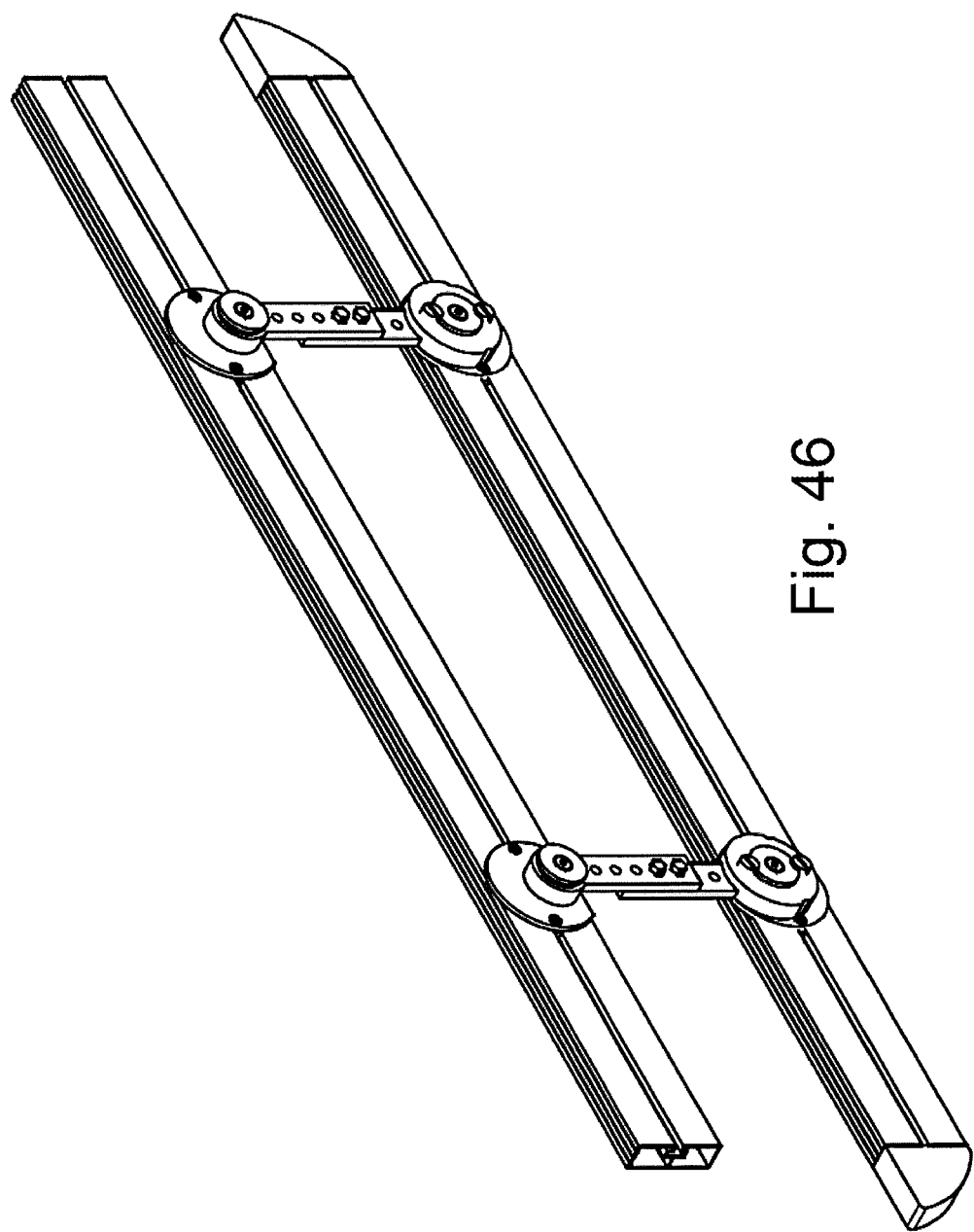
Figure 49:
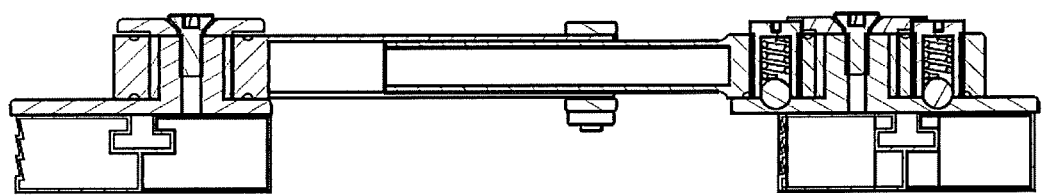
Figure 48:
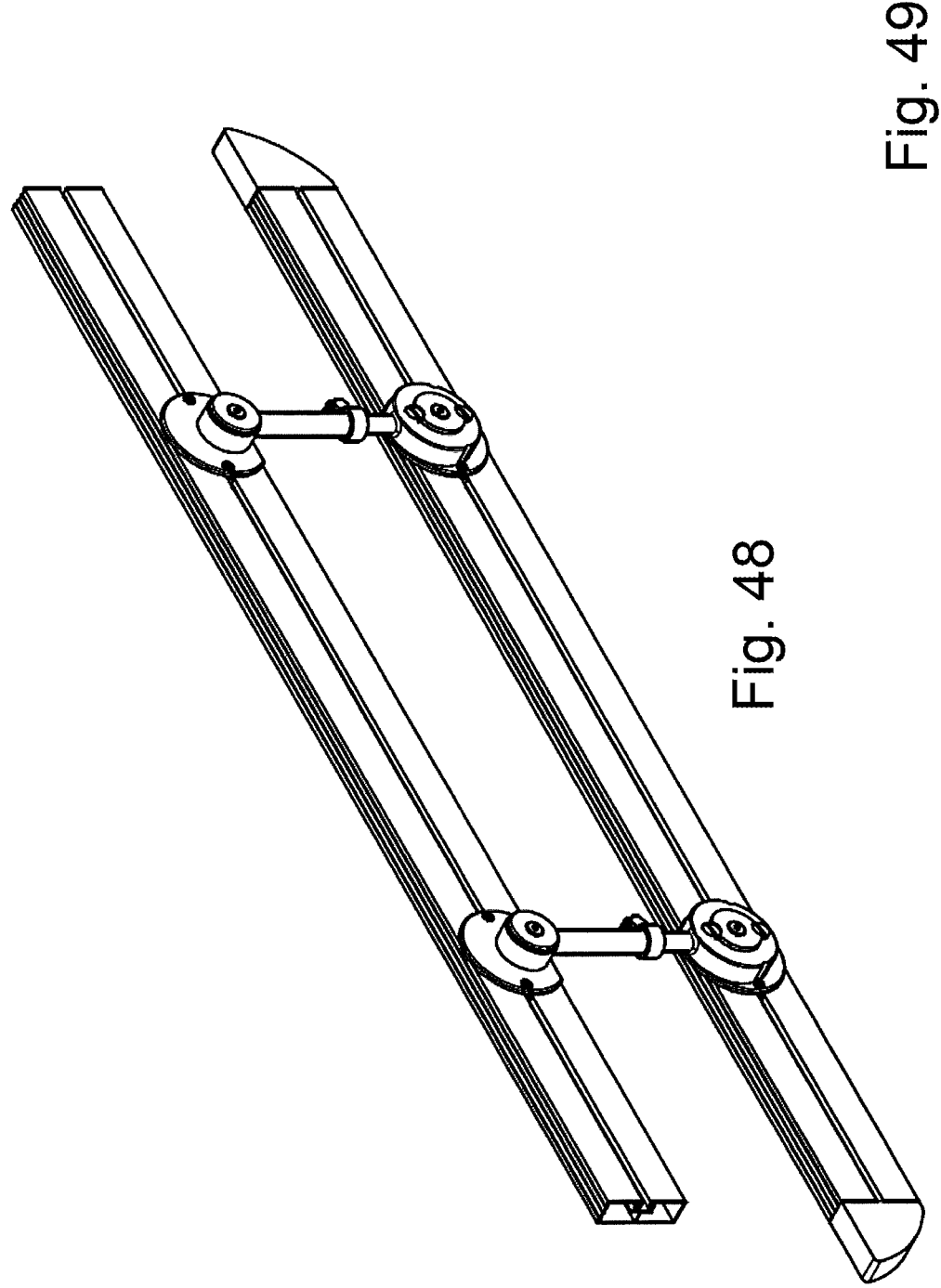
Figure 50:
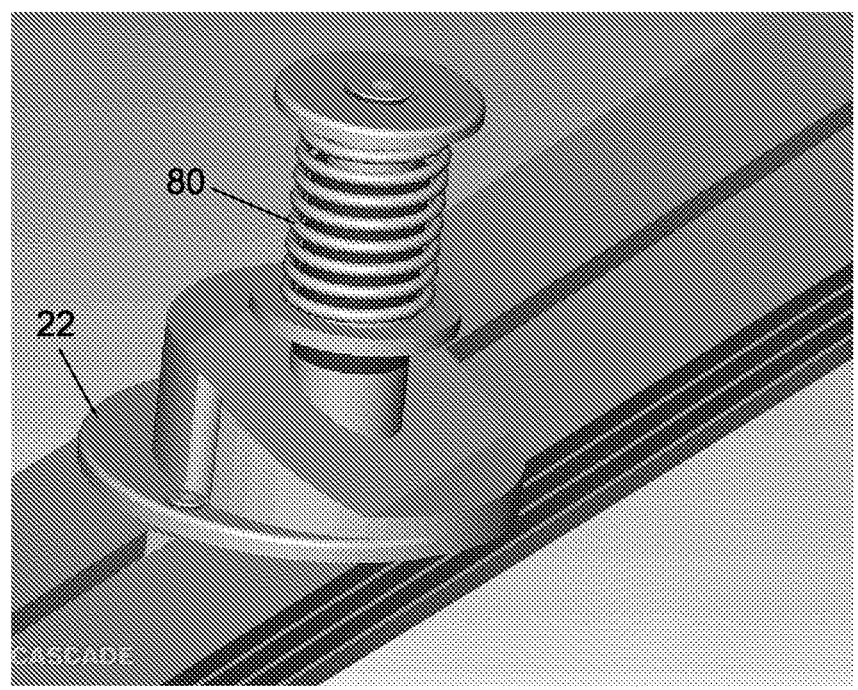
Figure 51:
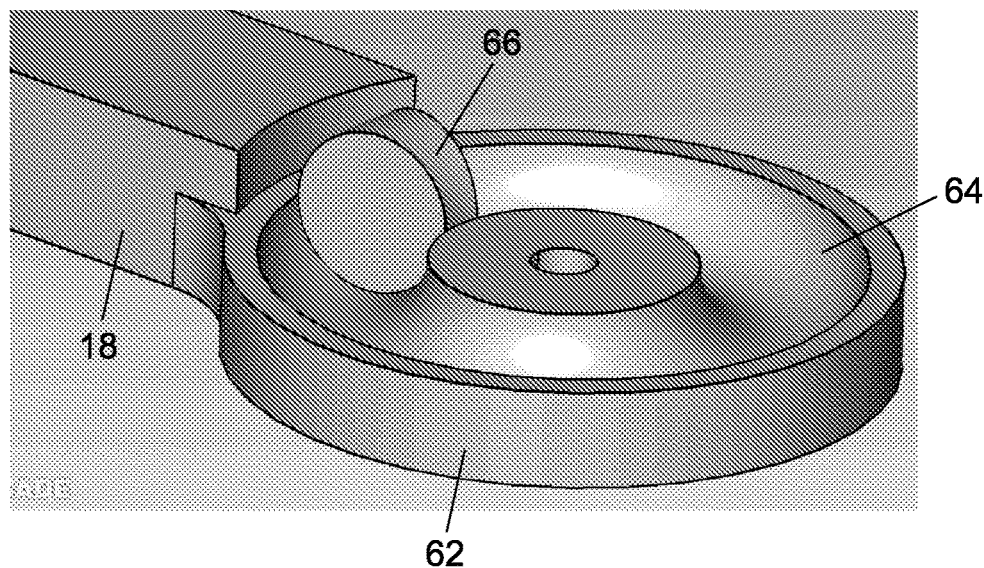
Figure 52:
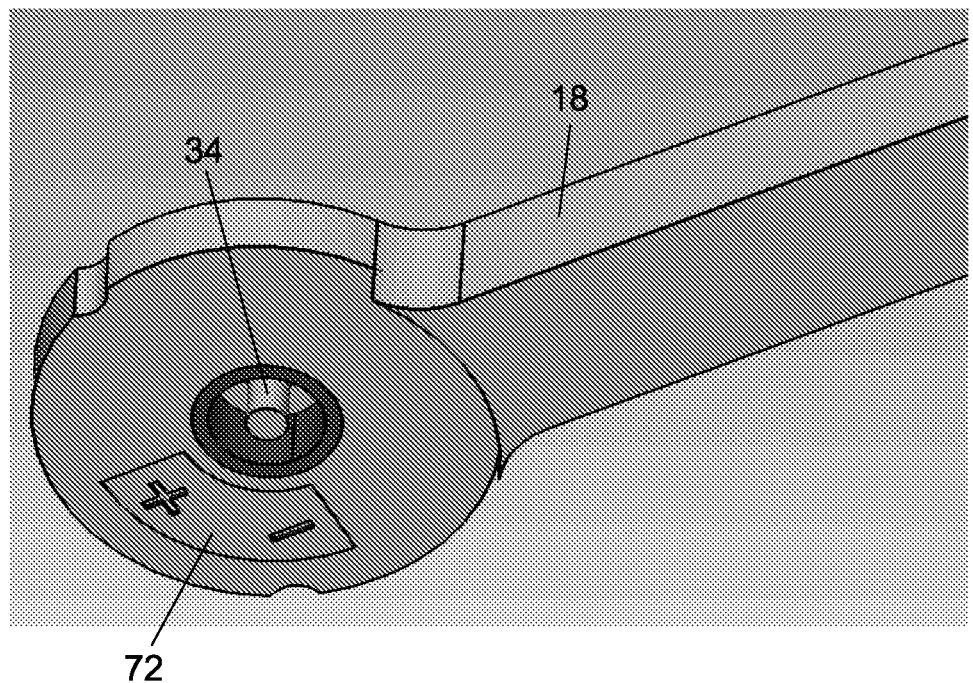
Figure 53:
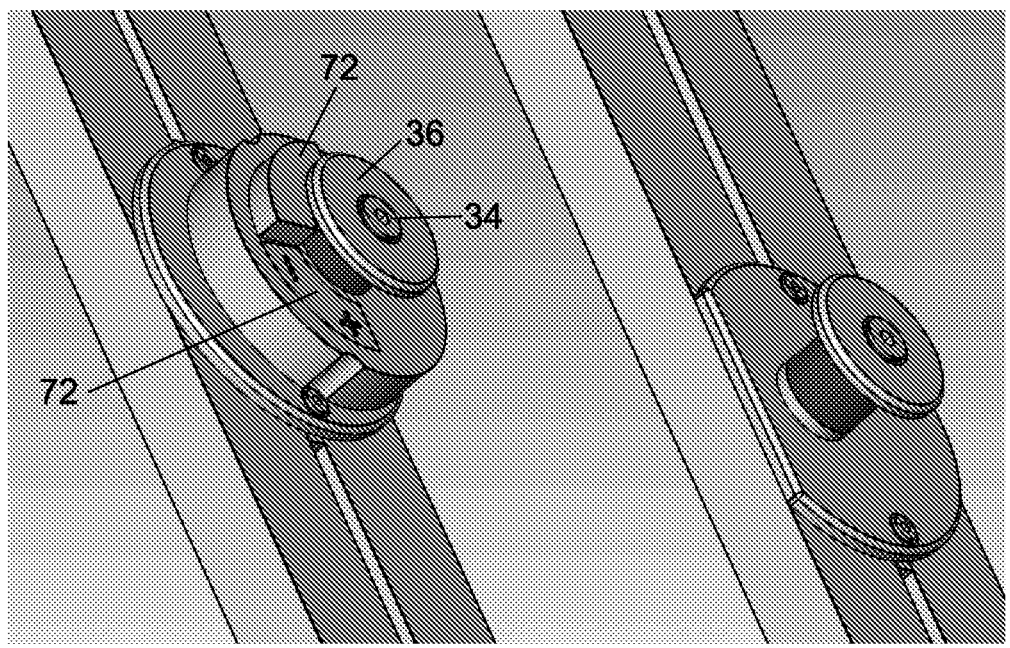

FIG. 26 shows the embodiment of FIG. 2, which has an adjustable arm length provided by virtue of a threaded member being inserted into an internally threaded socket of the other member which members can be relatively rotated with respect to one another until they acquire a desired length, such turning being achievable before an end of the arm is attached to a barrier member, that attachment then locking or preventing from further twisting 2;

FIG. 27 shows a further embodiment similar to FIG. 24 but in which the arm and the ends thereof are thicker to bring the ends of the spring mounted balls (contained in a removable carrier) has its carrier end flush with the end of the arm as per FIG. 3;

FIG. 28 is a schematic section of the embodiment of FIG. 4 and FIGS. 29 and 51 also show details of that embodiment, 29 with the arm removed and 51 being just the arm;

FIG. 30 is a schematic section of FIG. 5;

FIG. 31 is a schematic cross section through the embodiment of FIG. 6;

FIG. 32 is a schematic cross section of the embodiment of FIG. 9, with FIG. 33 showing further details in perspective with the arm removed to allow visibility of the spring inside one of the ends thereof;

FIG. 34 is a schematic cross section of the embodiment of FIG. 10 with FIG. 35 showing a schematic for the arrangement of the magnet and FIGS. 52 and 53 showing further details in perspective;

FIG. 36 is a schematic cross section of the embodiment of FIG. 11;

FIG. 37 is a schematic cross section through the embodiment of FIG. 12;

FIG. 38 is a schematic cross section through the embodiment of FIG. 14;

FIG. 39 is a schematic cross section through the embodiment of FIG. 15, with FIG. 50 showing further details in perspective with the arm, but not the cam removed;

FIG. 40, like FIG. 39, shows a further schematic cross section, but this time on the embodiment of FIG. 16;

FIG. 41 shows a schematic cross section of FIG. 17;

FIGS. 42 and 43 show a further embodiment of the present invention, with FIG. 42 being a schematic cross section and FIG. 43 being a perspective;

FIGS. 44 and 45 show a further embodiment of the present invention with a telescopic arm albeit with a square cross section and a bolt for locking it into position, with FIG. 45 being a schematic cross section and FIG. 44 showing it in perspective;

FIGS. 46 and 47 show an embodiment similar to that of FIG. 45, albeit with joined plates to form the arm, with adjustment being again possible with one or more bolts (two or more preferred for arm stability) through various holes between the two portions of the arms, with FIG. 47 being a schematic cross section thereof; and FIGS. 48 and 49 show a further embodiment similar to that of FIG. 45, but this time with a nut for pinching closed a slot in the outer cylindrical member of the arm for gripping the inner pipe or bar of the arm, with FIG. 48 showing a perspective view and FIG. 49 showing a schematic cross section;

FIGS. 50 to 53 are briefly introduced above.

Referring back now to FIG. 1, there is shown a side barrier 10 for retrofitting onto a pre-existing side barrier of a truck or trailer, or a bottom rail 12 of a pre-existing side rail on a trailer or truck. For the purpose of this specific description we will hereinafter treat the barrier member 12 without any end pieces 20 as being a part of the side barrier of the invention.

As can be seen the side barrier 10 comprises two barrier member 12, 14 each made of a profiled cross section with a space running along it in the shape of an upturned T 16, in cross section. The space is formed in one of the side faces of the member 12, 14. These sections generally correspond to the shape and form of the sections used for the pre-existing side barriers you might find on vehicles, especially trucks or trailers. It should be noted, however, that other cross sections might instead be provided.

The T groove 16 functions to connect two arms 18 between the two barrier members 12, 14 so as to link them together.

The barrier members 12, 14 include a first barrier member which is generally fitted to the pre-existing side member of the truck or trailer, e.g. with bolts or welding and is thus an upper barrier member 12, and a second barrier member 14 that usually sits at the bottom end of the support arms 18 and is thus, in this illustration, a lower barrier member 14. One can also tell it is a bottom barrier member as it has end pieces 20 in each end for rounding off or making more aerodynamic and safe the free ends of that lower barrier member 14. These end pieces can have other shapes too.

As the arms 18 support the lower barrier member 14 underneath the upper barrier member 12, the arms 18 are commonly referred to as support arms 18.

Although not shown, additional barrier members might be provided in the event that longer arms are required so as to maintain an adequately small gap between the barrier members. This is to comply with Standards set for the pre-existing side barriers.

Referring next to FIGS. 22 to 25, further details of the side barrier 10 can be derived, particularly from FIGS. 24 and 25. Referring first to FIGS. 24, and 22 for that matter, the top of each barrier member 12, 14 is roughened. This is to make the edge less slippery so it can more easily be trodden on—for example for accessing the side of the vehicle. Furthermore, the attachment of the support arm 18 to the barrier members 12, 14 uses the T groove 16 by the provision of a T shaped member extending from the underside of a base plate 22 of a hinge 24, 26 at each end of the support arm 18. As shown in FIG. 25, these can be T brackets tightened with nuts 26, one shown, but as there is more than one as shown in FIG. 23, the base plate 22 is solidly attached to its barrier member.

Base plates are provided at each end of the arm.

Each hinge 24, 26 on an arm 18 in this embodiment is different with the top hinges 24 being relatively simple, being a hole in the end of the arm 18 through which a hinge pin 30 can extend with an outer bearing surface 32 on the pin 30 providing a smooth rotation and with a screw bolt 34 and top flange 36 holding them all together on the base plate 22.

The pin may be integral with the base plate 22 or with the top flange 36, or a separate component.

The other end is a more complicated hinge but again has a similar base plate 22, a through hole in the arm 18, a hinge pin 30 extending through the hole in the arm 18, with an outer bearing surface, and all connected together by way of a screw bolt 34 and a top flange 36. It differs, however, in that the size of the second end of the arm is much bigger so as to accommodate, in this embodiment, two sprung ball latches 38 for providing a resistance to initial rotation. The sprung ball latches 38 comprise tubular casings 40 containing a spring 42 and a ball 44 and then in the base plate 22 two detents, matching to the positions of the sprung ball latches 38 when the arm 18 is perpendicular to the barrier member 14. To make this easiest to achieve they are arranged along the central axis A of the arm 18—see FIG. 23.

A skilled person would also understand that other arrangements for these various features could instead be provided, such as a roller rather than a ball bearing, or even a rounded tip of a pin. Other variants can include one sprung ball latch 38, or more than two sprung ball latches 38.

As can be appreciated from FIGS. 23 and 1, the embodiment is designed to swing if needed. For this to occur, the ball (or roller) will be forced out of the detent by enough attempted movement of the lower barrier member 14 relative to the upper barrier member 12 and only once the force is high enough will the ball 44 release from the detent in the base plate 22, by rolling or sliding out of the detent. Then, when the lower barrier member 14 swings back to the down position, the balls 44 can reengage the detents of the base plate 22 once again.

Referring next to FIGS. 2 and 26, a similar arrangement is provided in that the barrier member has similar hinges to that of FIG. 1, again with the more complex and larger and heavier hinge on the lower barrier member (as shown in FIG. 26). Putting it on the lower barrier, as can be determined from the presence of the plugs or end pieces 20, there is a greater mass at the swing end of the arms 18 thus providing a greater bias back to the default down position. This detail, be it of the hinge or some other swing resistance measure, appears again in a number of other embodiments.

Referring still to FIG. 26, as can be seen the arm is provided in two pieces—an upper piece which has a threaded outer surface 48 and an encompassing lower member 50 for screwing onto that threaded member thus providing adjustment until the relative rotation is locked by attaching both hinges to their respective barrier members. This adjustment is useful for situations where the pre-existing side barrier is arranged at either a lower or higher height than anticipated. The threads may have height indicators embedded in them to allow matching heights to be more easily achieved in each end of the side barrier 10.

Referring next to FIGS. 3 and 27, a further side barrier design is shown. This again looks very similar to that of FIG. 1, but the arm 18 is thicker whereby the tubular cases 32 no longer extend outward of the remaining surface of the arm 18. Alternatively, the tubular cases, can be made shorter so the arm 18 can remain as in FIG. 1. Other thicknesses of arms and lengths of tubular cases may also be used, providing protruding, flush or recessed arrangements.

Referring next to FIGS. 4, 28, 29 and 51, a further embodiment is disclosed. This embodiment has a similar upper hinge 26, 24 to the first embodiment although the base plate 22 is now rectangular rather than round. Furthermore, the base plate 22 is thicker to match the thickness of the other end of the arm 18.

The other end is thicker as it needs to accommodate two "push pull" springs 54 in a coil within it. See FIG. 51 for the channel in the hinge end of the arm 18 that receives the two springs 54, 56—here being coil springs, and FIG. 29 which shows the coil springs 54, 56 inside the similar round groove or channel 60 in the base plate 22—particularly within a circular collar 52 extending up from the main flat part of the base plate 22. As can be seen in FIG. 29, the circular coils 54, 56 comprise a first coil spring 54 and a second coil spring 56 with a first end of each spring 54, 56 mounting against a stop 58 in the curved and semi-circular channel 60 discussed above. Then, the arm 18, the end 62 of which has a corresponding curved and semi-circular channel 64, and with an opposite stop 66 located within it distanced 180° around the channel compared to that of the preferably circular collar of the base plate 22 defines the space once the end of the arm is located on top of the springs on the base plate. One of the stops is mounted to each half of the channel 60, 64, so as the arms swing the springs compress and stretch respectively against their stops.

Each of these springs 54, 56 are dual directional springs and thus they will pull back if you stretch them and will push outwardly again if you try to compress them. Thus, this "dual spring" arrangement can provide a general bias towards a default downward position, as desired.

Referring next to FIGS. 5 and 30, an alternative dual spring arrangement can be seen in which two simple hinges, albeit one larger than the other but both involving a hole in the end of the arm and a pivot pin and retention cap, are provided. Then to the external sides of one end of the arm 18, coil springs are provided. In this embodiment, they are externally positioned rather than internally positioned and simply have hooks at their ends for hooking onto a peg on the base plate 22, and into a hole in a flange (here provided on either side of the arm 18), with each coil spring 54, 56 being dual directional springs as before so that as the arm swings the first spring 54 might first compress and the second spring 56 will then stretch and then when it returns and if it swings the other way the second spring 56 compresses and the other spring 54 expands, in both directions the springs 54, 56 attempting to return the support arm 18 to the default position—with the arm perpendicular to the barrier member 12, 14 to which it is attached.

There can be other arrangements for any of these embodiments, including some of the next ones to be described, or where the arm does not extend perpendicular to the barrier members 12, 14 in its default position.

Referring next to FIGS. 6 and 31, a further embodiment is disclosed. In this embodiment, shear pins 70 are provided in the hinges as shown—see the pin ends 68 and pins 70 in FIGS. 6 and 31 respectively.

Referring to FIG. 31, these pins 70 can be arranged within one or both of the hinges of an arm such that a pin 70 extends from the end of the arm through to some member of the base plate 22. As a result, as shown in FIG. 31, the hinge pins 70 extend through the arms 18 and into a hole in the end plates 20. Thus, the shear pins 70 will resist rotation of the arms 18 relative to the barrier members 12, 14 until they are sheared off by the force applied to the barrier member 12, 14. On each occasion of such shearing, the shear pins 70 have snapped and thus they will need to be replaced. Nevertheless, they can assist with the functionality of a barrier member 12, 14 for resisting swinging below the pre-existing side barrier until a threshold force is applied.

Referring next to FIGS. 9, 32 and 33, a coiled clock spring is used as the biasing member for resisting rotation of the arm. As can be seen, the base plate is similar to previous embodiments and the larger end of the arm 18 is designed to encase some kind of spring member. In this case, it is a coiled watch spring. FIG. 32 shows this arrangement in cross section and as can be seen there are many similarities to previous embodiments, especially that of FIG. 28, with the top hinge being pretty much identical and with the bottom hinge being very similar albeit with a square section enclosure for the coiled watch spring, rather than the previous circular enclosure or channel for the two coil springs.

Referring then to FIG. 33 the coil can be seen. As will be appreciated, with the end of the coil being attached to an inside of the end of an arm 18, upon swinging of the arm 18 the coil will either tighten to create a first spring bias, or reverse its coil, thus creating an alternative spring bias, with these options both tending to bias the arm 18 back into the default—here down—position due to the spring force imparted onto the spring by that winding or unwinding.

Figure 7:
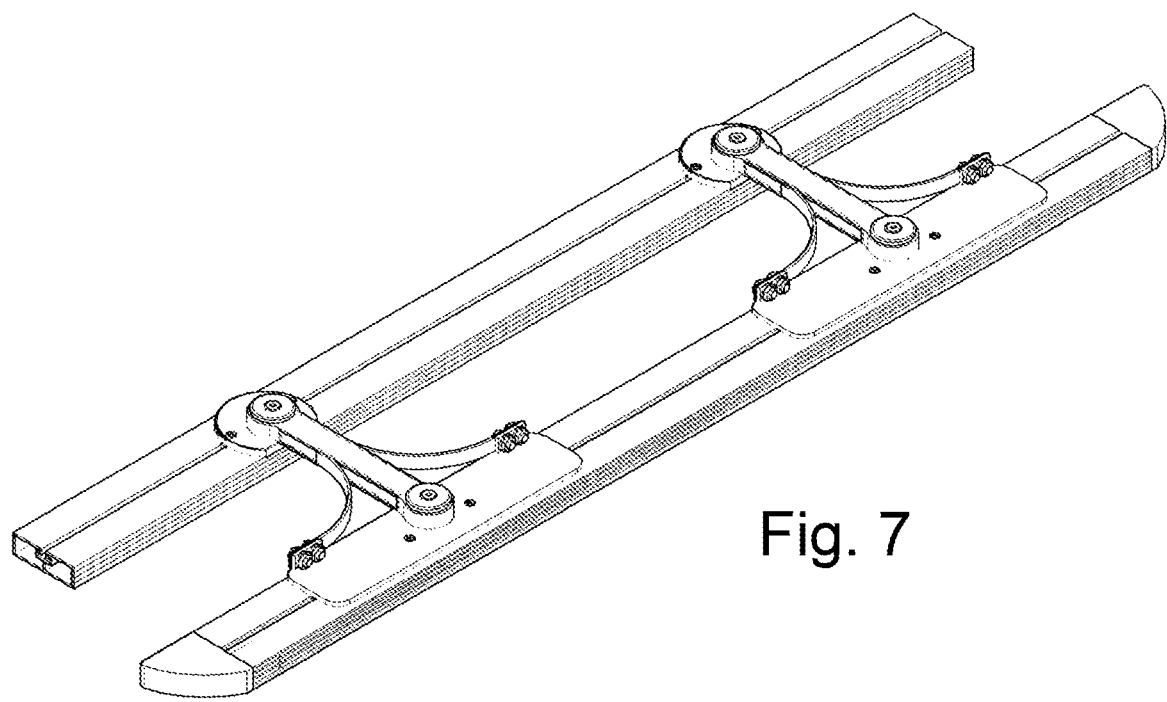
FIG. 7 is a further embodiment utilising a pair of leaf springs for each arm, again for resisting swinging.

Referring next to FIG. 7, instead of the two external springs of FIG. 5 being coil springs, they are leaf springs. This time, rather than both ends of the arm 18 (hinges) having different sizes, the two ends are the same size. The same can be present in the embodiment of FIG. 5 as well, if desired. The leaf springs are arranged to extend down from the sides of the arms near the top thereof down and outwards towards edges of a widened base plate so that as the arm swings, the preloaded leaf springs will loosen on one side and tension on the other and vice versa, thus finding equilibrium in the middle.

Figure 8:
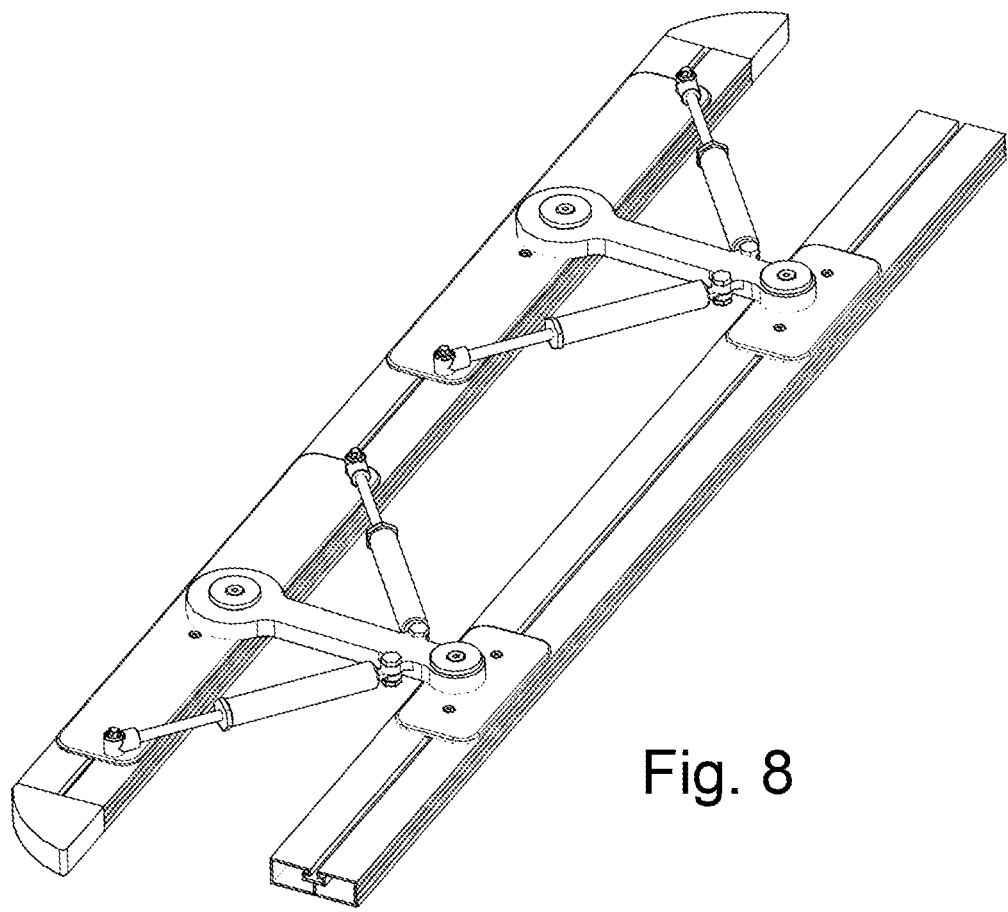
FIG. 8 is a further embodiment utilising sprung dampers for controlling the swinging of the side barrier.

FIG. 8 shows a further similar embodiment to FIGS. 5 and 7 by having sprung pistons on either side of the arm. Here, the pistons are arranged with their rod ends spaced apart on the lower barrier member and the cylinder ends of the pistons towards the top of the arm close together on the sides thereof. As a result, the spring force loaded inside the sprung pistons or sprung dampers will tend to meet in an equilibrium at the central position, given that the spring force from each is equal at that condition. By providing matched sprung pistons this will be generally the case if it is built symmetrically.

By damping the pistons alternative swing responses can be provided.

Instead of this arrangement, the pistons may be arranged the other way up so as to be spaced at the top rather than at the bottom. Likewise with the other sprung arrangements.

As can be seen, in the central position, the pistons or dampers are arranged such that the rod is halfway extended so that it has room to both expand and retract outside and inside of the cylinder.

In FIGS. 10, 34, 35, 52 and 53, a further embodiment of side barrier is shown. In this embodiment, the top hinge (without the end pieces 20) are again as per the previous embodiments—simple. Further, the base plates, which may have a different shape are shown to have a generally rounded shape, as per some of the previous embodiments.

A similarly shaped base plate is also provided for the lower hinges. The lower hinges are free to swing save for the presence of a magnet 72 in each relatively rotatable part. These magnets 72 are arranged with a first magnet in the base plate part of the hinge and the other located in the arm part. Furthermore, they are arranged so that the polarities of the magnets 72 align with their opposing polarities on the opposite part and are positioned on the base plate and end of the arm such that the magnets are attracted to one another when the arm is reaching down into the default (down) direction. Thus, there will be a resistance to swinging. However, upon swinging commencing, the magnetic draw will reduce, thus instead relying only on gravity to return the barrier member 14 to the default position—aided at the end by the magnet, thus again resisting swinging.

Referring to then FIG. 34, the aperture with the two magnets 72 inside it can clearly be seen.

Referring then to FIG. 52, the underside of the arm 18, once removed from the base plate part of the hinge, is shown, although here the bearing surface lining the hole in the arm for the hinge pin (rather than having it on the hinge pin instead). In it is a first magnet 72. There is also shown the screw bolt 34—which is short as the pivot pin is integral to the base plate. Then, as can be seen in FIG. 53, where the top flange 36 is fixed down with a screw bolt 34, but without the arm, the magnet 72 with the plus and minus poles (shown for clarity but the polarities can be reversed—and likewise on the arm—to match) is slotted into a suitably shaped hole (not shown). Then, as shown in FIG. 53, the base plates 22, with its arm receiving surface, is likewise fitted with a magnet which is like poled and positioned so that the other magnet in the end of the arm, as shown in FIG. 53 (with the exclusion of the arm) such that the positive of the upper magnet aligns closely with the negative of the lower magnet and thus will resist separation—which would occur if the arm was to be swung in a direction to pull the two magnets apart, and would likewise resist stacking if there was a cause for the magnets to slide over one another, i.e. in the event that the arm was to be rotated in the other direction) as the magnet would not be inclined to slide given their polarity repulsion with this arrangement. This arrangement thus also resists swinging until a threshold force on the swingable barrier member is passed Referring next to FIGS. 11 and 36, a further embodiment is shown in which the upper hinge is a simple hinge, again involving a hole in the end of the arm and a pivot pin extending through that hole from the base plate, with a top flange for securing the arm in place. As for the bottom hinge 26 it is like the first embodiment in that it has sprung ball and detent retention in its standard position. This embodiment additionally, however, has a split arm with a top half 74 and a bottom half 76. Although the term half is used this is not necessarily a measured half and it may just relate to the concept of it being in two pieces. The two halves join tightly—butt together—to one another by and are then joined together by the provision of a rubber block—in this embodiment a pair of them on either side thereof. These rubber blocks are positioned on the front and back of the arm. The blocks are retained on the arm by the provision of bolts extending therethrough from the outside of the rubber and through the halves of the arm 18.

The rubber provides stability to the lower bar in the lateral direction once fitted to the side of the vehicle. However, it does also provide a degree of possible lateral deflection in the event that it becomes necessary due to hitting something like a kerb.

In FIGS. 12 and 37, instead of the rubber block, there is provided a pair of coil springs. These springs are tension springs rather than dual springs. Other forms of spring could likewise be provided.

The coil springs 78 are attached to the halves of the arm 18 by bolts at the ends of the springs, one bolt in the top half of the arm and the other bolt in the bottom half of the arm.

The non-hinged ends of the arms again are butted close together. They can be retained that way by putting the springs under a slight tension when attaching them to the arms.

Referring next to FIG. 13, a further embodiment is disclosed. This embodiment utilises big and small simple hinges for the arms. However, both could be small or both could be large. Other forms of hinge may also be suitable so long as they allow longitudinal deflection of the lower barrier member 14 relative to the vehicle's main axis. These arms in this embodiment are resisted from motion by a spring and dual arm system, much like an old fashioned door closer. This arrangement comprises a spring—in this embodiment enclosed within an enclosure, and two articulated arms with one end of one of them connected to the spring, the other end of the other articulated arm connected to the support arm 18 generally at the opposite end thereto compared to the spring and then the final ends of the articulated arms are joined together with a hinge-connection. The first of these three joints is fixed relative to the spring so as to load the spring if the articulated arm is moved, whereas the other two joints need to be flexible so that the two articulated arms can transmit the force from the spring. This door closing structure is already well known in the art of door closers. It thus will not be further described herein.

The functionality of this embodiment of side barrier 10 is that as a swing occurs, it will load the spring within the enclosure. Thus, when the force causing the swinging recedes, the loaded force within the spring of the closer will cause the support arm 18 to return to its default downward position. Likewise, if the barrier member 14 is forced to swing in the opposite direction, the spring in the enclosure will again load, just in the opposite direction, thus again biasing it into a closed position once the force is released.

This embodiment might likewise be fitted with a sprung ball in detent feature to help to retain the lower barrier member in its default position until an adequate force is presented thereagainst.

FIGS. 14, 38, 15, 39, 16 and 40 then disclose further embodiments, all of a similar nature. These further embodiments likewise as with many of the previous embodiments incorporates a hinge 24, 26 at the top and bottom of a pair of support arms 18, although as with all the embodiments, further arms 18 for longer barrier members 12, 14 might be provided.

Furthermore, for two of these further embodiments, as shown in FIGS. 14 and 16 the hinge 26 at the bottom is of the previously described smaller simple design whereas the other hinge is of a more complex design, comprising a camming system. In the third of these embodiments—see FIG. 15, the support arm 18 and hinges are reversed so that the simple hinge 24 is on the upper barrier member 12. Upper and lower barrier members are signified by the presence or not of the end pieces 20. This means that the camming system 26 is arranged at the bottom hinge 24.

As can be seen from FIGS. 14, 15 and 16, the more complicated cam hinge is formed from a first piece forming a predominant part of the base plate 22, which can be circular, or in the case of FIG. 14, generally shield shaped. FIG. 15 shows the generally circular shape as does FIG. 16. The shield shape is provided to allow the cam system to be displaced vertically compared to that of FIG. 16, which is particularly useful when the camming hinge is mounted on the upper barrier member 12 as the lower barrier member 14 can then potentially deflect over the side face of the upper barrier member 12.

As the arms 18 swing, in either direction in this embodiment, the cam hinge end of the arm 18 will climb on the cam due to interfacing surfaces on the arm and the base plate so as to lift (in the direction to compress the spring mounted on the end portion of the arm 18) the arm, and thus also the lower barrier member 14. This displacement, which will be lateral when on a truck or trailer thus compresses the spring 80 mounted between the top flange 36 and the arm 18. As the cam spring 80 becomes compressed, it will in return tend to force the reversal of this lifting or lateral displacement, and upward swinging of the barrier member when the load on the lower barrier member is reduced, thus resulting in the return thereof to the default position, assisted of course with gravity.

Referring then to FIG. 50, it can be seen that the can spring is held off the end of the support arm 18 by a washer between the underside or bottom of the cam spring and the top face of the support arm 18. This washer prevents the cam spring from resisting or sticking against the support arm 18.

As for the cam, it is shown to be a ramp that is arranged, in this embodiment, effectively as a wedge that enlarges as it bridges perpendicularly across the width of the barrier member to which it is attached. The cam on the end of the arm is similarly angled so as to allow the arm to sit flat thereagainst when not rotated and for it to lift thereagainst, compressing the spring 80, when the arm 18 is rotated/swung.

Other cam forms also are well known in engineering fields. These can also be utilised.

Referring next to FIGS. 17, and 41, a further arrangement for a two part arm is shown. It again has a top half 74 and a bottom half 76 but instead of the springs or rubber/elastomeric washers of FIG. 11 or FIG. 12, it has sideways extending flanges which are spaced relative to one another when the free ends of the two arms are butted together. The spaces provide space for a rubber washer or an elastomeric washer 82. This washer allows a compression of the space by bending the joint, thus allowing flexure laterally of the lower barrier member in the event it is needed. Furthermore, outside the flanges further rubber or elastomeric washers 84 are provided. These outer washers are potentially at each end of a through bolt but in this embodiment the through bolt's head butts against one of the flanges 90 and then through the middle washer 82 then through the other flange 88 before then extending through a single outer washer 84 before then being compressed in place by a metal washer and nut 92. This arrangement, either with one or two outer rubber washers 84 (or elastomeric washers), also known as bushings, additionally allows flexing in the opposite direction, and thus allows flexure in both laterally inward or outward directions.

As before, this flexure is useful in the event of collision with a kerb.

FIGS. 42 and 43 show a variant of this previous embodiment, with two outer rubber washers 84. Additionally, however, rather than having the two ends of the two parts of the arm butting together, they are hingedly connected together.

Referring next to FIGS. 44 and 45, a further embodiment similar to that of FIG. 2 is shown but instead of a screw thread, the telescopic arrangement is a box section with through holes to allow a few different lengths to be provided—the bar that slides inside the outer sleeve is likewise provided with multiple holes so that the receiving sleeve can be fitted thereto using a bolt.

As with previous embodiments, the arrangement also utilises a sprung ball and detent feature for retaining the lower barrier member in its default position. However, again swinging can occur when the retention force is overcome. Other swing resistance mechanisms such as any of those described previously may thus also be incorporated into this design. This could either be supplementing or replacing the sprung ball and detent feature.

FIGS. 46 and 47 and then 48 and 49 then disclose two further embodiments with adjustable arms. FIGS. 46 and 47 show plates rather than a telescopic mechanism, which plates can have holes drilled or formed therein which can be aligned relative to the other part of the arm. Bolts can then be used to connect them. In this embodiment, it will be usual to use two or more bolts so as to prevent swinging at this connection point. As for FIGS. 48 and 49, they show another telescopic arrangement with a tubular component arrangement but instead of a screw thread for fixing the respective lengths, or through bolts, the first tube can have a split end and a tightening wraparound member or nut, much like a bicycle saddle stalk retention mechanism, so as to allow relatively easy in situ adjustments of the length between the first tube and the inner tube or stalk.

The present invention has therefore been described above purely by way of example. It will therefore be appreciated that modifications and combinations in detail and feature may therefore be made within the scope of the claims appended hereto.

The invention claimed is:

1. A side barrier for a vehicle, the side barrier comprising at least one barrier member and at least two support arms between which the at least one barrier member hingedly extends, the at least two support arms being provided with hinges, one for connection to the at least one barrier member and the other for connecting the side barrier to the vehicle in a position lying parallel to a longitudinal length of the vehicle, wherein all the said hinges are arranged with respectively parallel axes, wherein the respectively parallel axes of the hinges are arranged to extend generally perpendicular to the longitudinal length of the vehicle once the side barrier is connected to the vehicle, and wherein at two hinges on different support arms, a camming arrangement is provided to swing the swinging barrier member slightly laterally as well as vertically when it swings about said parallel axes.

2. The side barrier of claim 1 having at least two barrier members, each with at least two support arms.

3. The side barrier of claim 1, wherein at least one of the hinges has a swing limitation arrangement whereby the degree of swing of the barrier member is limited.

4. The side barrier of claim 1, wherein at least one hinge comprises a ring member for rotation around a pivot pin.

5. The side barrier of claim 4 wherein the ring member is in a support arm.

6. The side barrier of claim 1, wherein the barrier member is spring biased towards a default position at all times.

7. The side barrier of claim 6, wherein resistance against swinging of the barrier is provided by external springs.

8. The side barrier of claim 6, comprising any one or more of, d) wound and tensioned clock springs, e) the sprung bias on a cam or just the cam and the weight of the swinging barrier member together, f) a sprung door closer type of arrangement, with a spring in a box connected to a hinged arm, or g) dual direction coil springs arranged in a ring form.

9. The side barrier of claim 8, comprising any one or more of a) leaf springs, b) coil springs, c) sprung struts and dampers or otherwise, or g) dual direction coil springs arranged in a ring form, wherein these mechanisms are provided in matched pairs that can push or pull in response to relevant swinging motion of the swinging barrier member.

10. The side barrier of claim 1, wherein there are two support arms, attached respectively to two barrier members, wherein the two support arms are attached respectively to two barrier members at the ends of the support arms.

11. The side barrier of claim 1, wherein the side barrier is for retrofitting onto an existing lateral protection system of a vehicle.

12. The side barrier of claim 1, wherein resistance against swinging of the barrier is provided by two or more magnets.

13. The side barrier of claim 1, wherein resistance against swinging of the barrier is provided by sheer pins positioned across or through the hinge.

14. The side barrier of claim 1, wherein at least one of the hinges is provided with a detent or bias system, whereby the swing-freedom of the hinge is restricted until the barrier member is forced harder than a certain threshold.

15. The side barrier of claim 1, comprising a sprung-ball and detent feature.

16. A vehicle with a factory fitted side barrier, having fitted to at least the factory fitted side barrier a further side barrier comprising at least one barrier member and at least two support arms between which the at least one barrier member hingedly extends, the at least two support arms being provided with hinges, one for connection to the at least one barrier member and the other for connecting the further side barrier to the vehicle in a position lying parallel to the longitudinal length of the vehicle, wherein all the said hinges of the further side barrier are arranged with respectively parallel axes, wherein a bottom edge of a lowermost barrier member is arranged on the vehicle, such that when in its lowest, default position, the bottom edge sits between 100 mm and 350 mm above the ground, and below the factory fitted side barrier, wherein the respectively parallel axes of the hinges are arranged to extend generally perpendicular to the longitudinal length of the vehicle once the side barrier is connected to the vehicle, and wherein at two hinges on different support arms, a camming arrangement is provided to swing the swinging barrier member slightly laterally as well as vertically when it swings about said parallel axes.

17. The vehicle of claim 16, wherein the further side barrier is fitted under the vehicle to an inward facing side of the factory fitted side barrier.

18. A side barrier for a vehicle, the side barrier comprising at least one barrier member and at least two support arms between which the at least one barrier member hingedly extends, the at least two support arms being provided with hinges, one for connection to the at least one barrier member and the other for connecting the side barrier to the vehicle in a position lying parallel to a longitudinal length of the vehicle, wherein all the said hinges are arranged with respectively parallel axes, wherein the respectively parallel axes of the hinges are arranged to extend generally perpendicular to the longitudinal length of the vehicle once the side barrier is connected to the vehicle, and resistance against swinging of the barrier about said parallel axes is provided by either or both a) two or more magnets, and b) sheer pins positioned across or through one or more of the hinges.

19. The side barrier of claim 18, wherein the side barrier is for retrofitting onto an existing lateral protection system of a vehicle.

20. The side barrier of claim 18, wherein at least one of the hinges is provided with a detent or bias system, whereby the swing-freedom of the hinge is restricted until the barrier member is forced harder than a certain threshold.

* * * * *